US007013047B2

(12) United States Patent
Schmidt et al.

(10) Patent No.: US 7,013,047 B2
(45) Date of Patent: Mar. 14, 2006

(54) SYSTEM AND METHOD FOR PERFORMING EDGE DETECTION IN AN IMAGE

(75) Inventors: Darren Schmidt, Cedar Park, TX (US); Ram Rajagopal, Austin, TX (US); Lothar Wenzel, Round Rock, TX (US); Dinesh Nair, Austin, TX (US)

(73) Assignee: National Instruments Corporation, Austin, TX (US)

( * ) Notice: Subject to any disclaimer, the term of this patent is extended or adjusted under 35 U.S.C. 154(b) by 765 days.

(21) Appl. No.: 09/894,272

(22) Filed: Jun. 28, 2001
(Under 37 CFR 1.47)

(65) Prior Publication Data

US 2003/0053696 A1    Mar. 20, 2003

(51) Int. Cl.
*G06K 9/48* (2006.01)
(52) U.S. Cl. .................................... 382/199
(58) Field of Classification Search ................ 382/173, 382/181, 190, 199, 203, 206, 209, 218, 228, 382/300, 316; 358/504; 702/127, 179
See application file for complete search history.

(56) References Cited

U.S. PATENT DOCUMENTS

| 5,081,689 | A | * | 1/1992 | Meyer et al. ............... 382/199 |
| 5,199,082 | A | * | 3/1993 | Venema ..................... 382/199 |
| 5,339,367 | A | * | 8/1994 | Roth .......................... 382/199 |
| 5,617,491 | A | * | 4/1997 | Roth .......................... 382/285 |
| 6,154,567 | A | | 11/2000 | McGarry .................... 382/219 |
| 6,408,109 | B1 | | 6/2002 | Silver et al. ................ 382/300 |
| 6,690,842 | B1 | * | 2/2004 | Silver et al. ................ 382/300 |

FOREIGN PATENT DOCUMENTS

GB          2203877 A    * 10/1998

OTHER PUBLICATIONS

Hata, et al. "Automatic extraction and tracking of contours", IEEE, pp. 441-445, 1996.*
Dougherty, et al. "ROC Curve evaluation of edge detector performance", IEEEE, pp. 525-529, 1998.*
U.S. Appl. No. 09/894,497, filed Jun. 28, 2001.

* cited by examiner

*Primary Examiner*—Daniel Miriam
(74) *Attorney, Agent, or Firm*—Meyertons Hood Kivlin Kowert & Goetzel, P.C.; Jeffrey C. Hood; Mark S. Williams

(57) ABSTRACT

A system and method for performing a curve fit on a plurality of data points. In an initial phase, a subset $P_{max}$ of the plurality of points which represents an optimal curve is determined. This phase is based on a statistical model which dictates that after trying at most $N_{min}$ random curves, each connecting a randomly selected two or more points from the input set, one of the curves will pass within a specified radius of the subset $P_{max}$ of the input points. The subset $P_{max}$ may then be used in the second phase of the method, where a refined curve fit is made by iteratively culling outliers from the subset $P_{max}$ with respect to a succession of optimal curves fit to the modified subset $P_{max}$ at each iteration. The refined curve fit generates a refined curve, which may be output along with a final culled subset $K_{final}$ of $P_{max}$.

32 Claims, 11 Drawing Sheets

Edge Detection in an Image

SYSTEM AND METHOD FOR PERFORMING EDGE DETECTION IN AN IMAGE

FIELD OF THE INVENTION

The present invention relates to the field of data processing, and more particularly to curve fitting using randomized or statistical techniques.

DESCRIPTION OF THE RELATED ART

Many scientific and engineering tasks involve fitting a curve or line to data in order to characterize the data. Examples of such data include temperature data as produced by a thermocouple or thermometer, pressure data produced by a pressure sensor, and voltage or current data, among others. Line or curve fitting of data is also a common approach in the field of image processing and analysis, for example, in edge detection. In most real world measurement systems the presence of noise in the measured signal complicates the analysis of the resulting data. Possible sources of noise include the environment in which the measurement is made, the sensors or actuators which produce the signal, and the data acquisition or measurement equipment which receives the signal from the sensor/actuator, among others. Such noise may introduce erroneous data into the data set, producing "outlying" data points, also called "outliers", which may lie outside the ideal range of the data. Outliers may also be produced when a measured phenomenon is more complex that is assumed by an investigator, i.e., when the theoretical understanding of the phenomenon is overly simplified.

Various techniques have been developed to handle the problem of fitting noisy data. For example, linear least squares error fitting (LSE) is a standard approach with a vast number of applications. In LSE, the best line fitting a set of points, under a certain error norm, is found. However, when the data are not well behaved, i.e., when the data set contains multiple clusters of data points, LSE tends to generate the wrong line.

If the outliers are few and not very far from the ideal line, standard statistical robust techniques can be used to find the best line fitting the set. For more extreme situations more complicated methods exist but tend to be computationally very complex. In some applications, such as image processing, the outliers can be numerous and wide-ranging. In certain problems several lines may be present in a set (see FIGS. 4 and 6A–C). Usually one is interested in finding the strongest line in the set, which is the line defined by the largest number of points.

Standard approaches to this problem include various clustering algorithms such as principal curves and non-linear optimization, and the Hough Transform. Cluster based line fitting algorithms attempt to cluster points together in bundles before performing a line fit, typically by arbitrarily assigning center points in the data set, and then moving these data points in such a way that all the points in the set are within a specified radius from one of the center points. These algorithms require at least $O(N^3)$ work. Approaches such as linear by parts principal components and non-linear optimal fitting rely on clustering, which is computationally very expensive and usually is an inadequate approach for many applications.

The Hough transform is a discrete counting process that can be used to deteremine all the lines in the set. Although this procedure is quite robust, it is computationally intensive, as well as memory intensive if an accurate solution is required. The Hough Transform transforms points to a new space where lines can be immediately identified. The idea is to create a 2D space, where x is the angular coefficient and y the linear coefficient of a line. Then, a discrete grid is placed in this space. Now each pair (x, y) represents a line equation. One can then count how many points fall over (or close to) each specific line equation. The (x, y) pairs with highest such number of points represent the desired lines.

In addition to being calculationally expensive, many of these strategies suffer from convergence problems, which makes them unsuitable for many kinds of applications. In many applications, such as image processing, the curve fitting must be performed in or near real time, making the computationally expensive methods described above unfeasible.

Therefore, improved systems and methods for curve fitting are desired.

SUMMARY OF THE INVENTION

The present invention comprises various embodiments of a system and method for fitting a curve to a plurality of data points using statistical or randomized techniques. The method may be performed by a computer having a memory, a CPU, and an input for receiving the plurality of data points. In one embodiment, the plurality of data points may comprise pixels of an image, and the curve fitting method may operate to perform edge detection on the image.

In one embodiment, the method may include generating a curve based on two or more random points of the received plurality of data points, testing the curve against a first subset of the plurality of data points to producing first test results, and if the first test results meet first criteria, outputting information regarding the curve. In one embodiment, the method may repeat the curve generation and testing a plurality of times to determine a curve which meets the first criteria. For example, the curve generation and testing may be performed iteratively until ending criteria are met, such as the number of iterations meeting or exceeding an iteration threshold and/or a number of data points of the plurality of data points within a specified radius of the curve meeting or exceeding a specified minimum value. In one embodiment, first subset may include substantially all of the plurality of data points.

In one embodiment, testing the curve against the first subset of the plurality of data points may include determining a number of the first subset of the plurality of data points which are within the specified radius of the curve. The first test results meeting the first criteria may include the number of the first subset of the plurality of data points which are within the specified radius of the curve meeting or exceeding a first threshold value or a specified fraction of the first subset.

In one embodiment, the method may also include pre-testing the curve against a second subset of the plurality of data points, preferably smaller than the first subset, to produce second test results, and if the second test results meet second criteria, then performing the above testing and outputting information. By pre-testing each generated curve against a smaller subset before testing against the larger subset, bad curves may be discarded early in the process, improving performance. In one embodiment, pre-testing the curve against the second subset may include determining a number of the second subset of the plurality of data points which are within the specified radius of the curve. The second test results meeting the second criteria may include the number of the second subset of the plurality of data points which are within the specified radius of the curve meeting or exceeding a second threshold value or a specified fraction of the second subset.

In one embodiment, outputting information regarding the curve may include displaying the generated curve on a display device. In various embodiments, the curve may comprise a line, a circle, or an ellipse.

In one embodiment, the second subset may be a random subset comprising randomly selected points from the plurality of data points. In one embodiment, the method may include randomizing the received plurality of data points to generate a randomized list of the plurality of data points, before performing the curve generation and testing. By shuffling the received data points at the first of the process, selecting data points randomly may be accomplished simply by traversing the randomized list. In one embodiment, the randomizing of the plurality of data points may include selecting a random starting position in the randomized list. Traversing the randomized list may then comprise traversing the randomized list starting at the random starting position.

In one embodiment, the method may also include performing a refined curve fit, using a subset of the plurality of data points comprising data points within the specified radius of the curve. The refined curve fit may include iteratively culling outlying data points from the second subset, generating a culled subset of data points, and fitting a refined curve to the culled subset at each iteration until an ending condition is met, thereby generating a refined curve. The method may then generate output, comprising information regarding the refined curve and the culled subset of the plurality of data points.

A more detailed embodiment of the invention is presented below.

In one embodiment, the method is implemented in two phases. In the initial phase, an attempt is made to find a subset $P_{max}$ of the input points I which represents an optimal curve. This phase is based on a statistical model which assumes that after trying at most $N_{min}$ random lines, each connecting a randomly selected pair of points from the input set, one of the lines will pass close enough (within a specified radius) to the subset $P_{max}$ of the input points. The subset $P_{max}$ may then be used in the second phase of the process, described below. Note that as used herein, the term "optimal" refers to an acceptable solution, but not necessarily the best, or "optimum" solution. As in other Las Vegas or Monte Carlo methods, a number of possible solutions are selected randomly, tested against some criteria, and the best selected as the solution.

The second phase of the method is a more rigorous process which computes a refined curve fit (as specified by the user) to a subset of $P_{max}$. Although the embodiment described herein relates to fitting a line to the input data, this is not meant to limit the method to any particular curves or dimensionality. In one embodiment, the method may be used for edge detection in a received image, wherein each data point is an image pixel, the specified radius is a pixel radius, and the resulting fitted curve comprises an edge in the image. Further details of the method are described below.

In the first phase, according to one embodiment, a minimum number of lines $N_{min}$ needed to statistically find an optimal line may be calculated, along with a minimum number of points $p_{min}$ defining a line as optimal. These parameters may provide reasonable limits on the process run time, while also providing reasonable assurance that an acceptable solution will be produced. In various embodiments, the method may also include receiving the input data set, e.g., an image comprising a plurality of pixels. The input data set may be used to calculate $N_{min}$ and $p_{min}$.

In the preferred embodiment, the statistical model entails that the selection of the lines be random. To facilitate this need, the input set I may be randomized to produce a randomized working set P, which may then be used throughout the rest of the process. After the input data set has been randomized, e.g., in the form of randomized set or list P, a starting position may be selected at random. This step provides an extra randomizing influence to reinforce the neutrality or lack of bias in the statistical model.

Two or more points may then be selected from the data set P to generate a curve, e.g., two points (or pixels) may be selected to generate a line. In a preferred embodiment, the two or more points may be selected randomly. In one embodiment, where the random starting position has been selected, the two or more points may be randomly selected simply by selecting the next two or more sequential points from the data set or list P, beginning at the random starting position. The generated curve may comprise a line, although in other embodiments, the generated curve may comprise a circle, an ellipse, or some other non-linear curve, in which case the two or more points (or pixels) selected may be greater than two. Generating the curve may comprise calculating two or more parameters defining the curve. For example, in the case of a line, the coefficients a, b, and c for the equation of a line ax+by+c=0 may be calculated.

A subset $P_m$ of P may then be selected, where $P_m$ comprises M data points, and tested against the generated curve. In the preferred embodiment, the subset $P_m$ of P may be selected randomly. As described above, in an embodiment where the set P has been randomized and a random start position selected, the selection of random points from P may be made simply by traversing the list P sequentially, maintaining a current position in the list. This technique substantially increases the performance of the method. A distance from each point of $P_m$ to the line may then be determined, producing a subset $P_j$ of $P_m$, where $P_j$ comprises J data points in $P_m$ whose distance from the line is less than or equal to the specified radius. For example, in the edge detection application, the number of pixels in the subset ($P_m$) whose distance from the curve is less than or equal to the specified pixel radius may be determined. In one embodiment, the resulting subset $P_j$ may be recorded.

The size of the subset $P_j$ may then be compared to the size of the input set P, e.g., the size of the subset $P_j$ may be compared to a specified fraction of the size of $P_m$. Said another way, a ratio of J to M may be calculated and compared to a threshold value. Thus, a metric, such as a relative size of the number of points in $P_j$ compared to the size of the input data set P, may be determined, checked against specified criteria, and used to control the process, as described below. In one embodiment, the calculated metric for each subset of the plurality of $P_n$ pixels may comprise a ratio of $P_j$ to $P_m$, and the specified criteria may comprise the ratio having a value which meets or exceeds a threshold. In another embodiment, the calculated metric for each subset of the plurality of $P_n$ pixels may comprise a ratio of $P_m$ to $P_j$, and the specified criteria may comprise the ratio having a value which does not meet or exceed the threshold.

If the ratio of J to M exceeds the threshold, i.e., if the fraction of points (or pixels) in the subset $P_m$ which are within the specified (pixel) radius of the line exceeds the threshold, then the remainder of the points in P (those points or pixels in P which are not in $P_m$) may be tested against the line, and those found to be within the specified (pixel) radius added to $P_j$. Thus, subset $P_m$ may be used as a pre-test for the line before testing all the points or pixels in P against the line.

The size of the updated $P_j$, J, may then be compared to previous values of J computed in previous iterations, and the maximum set retained as $P_{max}$, with size $J_{max}$.

Then, a test may be made for criteria to end the iteration. In one embodiment, the test may include the number of iterations meeting or exceeding an iteration threshold and/or the value of $J_{max}$ meeting or exceeding a minimum point count. In one embodiment, the iteration threshold may comprise the minimum number of curves $N_{min}$, described above. In one embodiment, the minimum point count may comprise $p_{min}$, also described above. And so, the iteration may be stopped when either enough curves have been generated that an acceptable solution may be expected, or when a candidate solution (subset $P_{max}$) contains more than the minimum number of points $p_{min}$ required to describe an optimal curve or line.

If the end criteria are not met, then the process may repeat, selecting a new two or more points from P to generate a new line, selecting a new subset $P_m$ to pretest against the line, and so on, until the end criteria are met. When the end criteria are met, output may be generated comprising the subset $P_{max}$ and the calculated parameters defining the corresponding curve as an estimated curve fit to the set P. In one embodiment, the output may be stored for later use. In another embodiment, generating the output may include displaying the generated curve, e.g., the detected edge in an image, on a display device.

Thus, in the above phase, a random line may be chosen from a set of points P. A randomly chosen subset of points in P may be tested against the line and if the number of "close" points exceeds some threshold, then the remainder of points in P may be tested against the line. Note that an input point is considered 'close' to the line (and placed in $P_j$) if its shortest distance to the line is not greater than a specified radius—a value specified by the user representing how far a point or pixel can be from the line to be considered 'fittable'. Because the distance operation is the most expensive, only a portion, e.g., r %, of points are tried for each random line, and only if some fraction of those points, e.g., m %, are close and are placed in $P_j$, then the rest of the points in P are tried for that line in an attempt to produce an optimal subset $P_j$. In this fashion, the number of distance computations are reduced. After each line is checked, if it is the best (largest) subset generated so far then the current results (Pj) are stored (in $P_{max}$) and a determination is made as to whether trying another line is necessary. It should be noted that in the preferred embodiment, all subsets of P are created via an indexing buffer so that no ancillary copies of the data are required. Thus, the $P_j$ values and $P_{max}$ values are simply referenced from P using this buffer.

In one embodiment, the output of the initial process phase described above may itself be used as a good estimated strong curve fit to the data, and the second phase may not be performed. However, by using a refined fitting technique in the second phase of the process, the quality of the estimate may be increased substantially.

In the refined fitting phase (second phase) of the process, the subset of points or pixels $P_{max}$ from the first phase is used to refine the estimated optimal curve fit. The method operates to iteratively cull outliers from the subset with respect to a succession of optimal curves or lines fit to the modified subset, as described below. A refined curve fit may thus be performed on the subset of data points or pixels $P_{max}$, generating a refined curve or edge, which may be output along with a final modified (culled) subset $K_{final}$ of $P_{max}$. In one embodiment, where the curve is a line, there are two stopping conditions for the iteration. The first is based on the fact that a perfect line fit will occur on a set of only two points, thus, when the subset is reduced to the minimum points required to form the curve (e.g., the two points required to define a line), the iteration is stopped. The second condition uses the user specified pixel radius and a requested fit score to generate a threshold error condition, $err_{max}$. In one embodiment, the score is given in the range [0, 1000] in which a higher the score implies a better fit. The second phase is described in more detail below.

A maximum error $err_{max}$ allowed in fitting a curve to the data may be computed, based upon the specified radius, or pixel radius. An optimal data set $K_0$ may be initialized to $P_{max}$ and a line $L_0$ may be fit to the data points (e.g., pixels) in $K_0$. An error $err_0$ may be computed for the fit. The line $L_0$ and the data set $K_0$ may be used as initial values for an iterative process in which one or more outliers of $K_i$ are removed based upon line $L_i$ in each iteration i.

Stopping conditions may be tested to determine whether to stop the iteration. The stopping conditions may include a current error $err_i$ (which is $err_0$ on the first iteration) exceeding the maximum error $err_{max}$, and the size of $K_i$, $|K_i|$, reaching a minimum number of points or pixels $N_c$ required to define the curve, or in the case of a line, a value of two. In other words, the iteration may continue while $err_{max} < err_i$, and $|K_i| > N_c$ (e.g., 2).

If the stopping conditions are not met, then $P_i$ points or pixels which are furthest from the line $L_i$ may be removed from $K_i$, resulting in a new subset of data points or pixels, $K_{i+1}$. In a preferred embodiment, $P_i$ may have a value of one, such that in each iteration, the furthest point in $K_i$ from line $L_i$ is removed. In one embodiment, where index buffers are used, and where $P_i = 1$, the removal of the point or pixel may be accomplished by swapping the point to be removed with the last valid point in $K_i$. Note that this is actually swapping indices and not actual point values which minimizes data movement. In addition, this approach maintains linear access in the following set $K_{i+1}$ and keeps the removed points (via their indices) at the tail. In one embodiment, $P_i$ may be calculated using the size of $K_i$. For example, $P_i$ may be some percentage of $K_i$, such as 10%. Thus, the value of $P_i$ may change over the iterations of the process.

A new line $L_{i+1}$ may then be fit to $K_{i+1}$, and a corresponding error, $err_i$ may be calculated for the fit. The iteration variable i may then be incremented, such that $L_{i+1}$ and $K_{i+1}$ become the new $L_i$ and $K_i$, respectively. In a preferred embodiment, the fit of the new line $L_{i+1}$ to $K_{i+1}$, may be performed as an incremental fit, wherein information from the previous iteration's fit is used to avoid calculating the new fit from scratch. This technique improves the performance of the method substantially. For each iteration that removes points or pixels, the numerical components in the line fit corresponding to those points or pixels are removed and the error of the new line fit is re-computed. This reduces the computation requirements of later fits to a trivial amount.

The method then tests again for ending conditions and repeats the point removal/refit operations until the stopping conditions are met.

When the stopping conditions are met, the iteration may be stopped and a score $s_{final}$ of a final curve $L_{final}$ on a final subset $K_{final}$, may be calculated, where $L_{final}$ and subset $K_{final}$ comprise final states of $L_i$ and $K_i$, respectively. The score represents the quality of the line fit on the final subset of points $K_{final}$. An error $err_{final}$ of the curve $L_{final}$ on the plurality of data points P (or I) may also be calculated.

Finally, result output may be generated. In one embodiment, the result output may comprise one or more of the final subset $K_{final}$, the size of $K_{final}$, the curve $L_{final}$ (e.g., the detected edge), the score $s_{final}$, the error $err_{final}$, and the plurality of data points or pixels P. Note that the error $err_{final}$, is computed over the entire input set P, not just the subset, $K_{final}$. In one embodiment, generating the result output may include displaying the result output on a computer display device. For example, in the edge detection application, the refined curve fit may be performed on the subset of pixels $P_{max}$, generating a refined curve comprising a detected edge in the image. The generated output may comprise information indicating the detected edge. For example, generating output may comprise displaying the detected edge on a computer display device.

It should be noted that in other embodiments, other methods for performing the refined curve fit may be used. For example, in one embodiment, performing the refined curve fit may comprise performing a mean squared error (MSE) curve fit.

Thus, the system and method described above finds a strong curve or line fitting a plurality of input data points, where the data points include outlying points which may skew curve fits based on standard fitting techniques. Additionally, the system and method may be used to detect edges in a received image, and may be applied to other applications of use, as well.

BRIEF DESCRIPTION OF THE DRAWINGS

A better understanding of the present invention can be obtained when the following detailed description of the preferred embodiment is considered in conjunction with the following drawings, in which.

Figure 1:
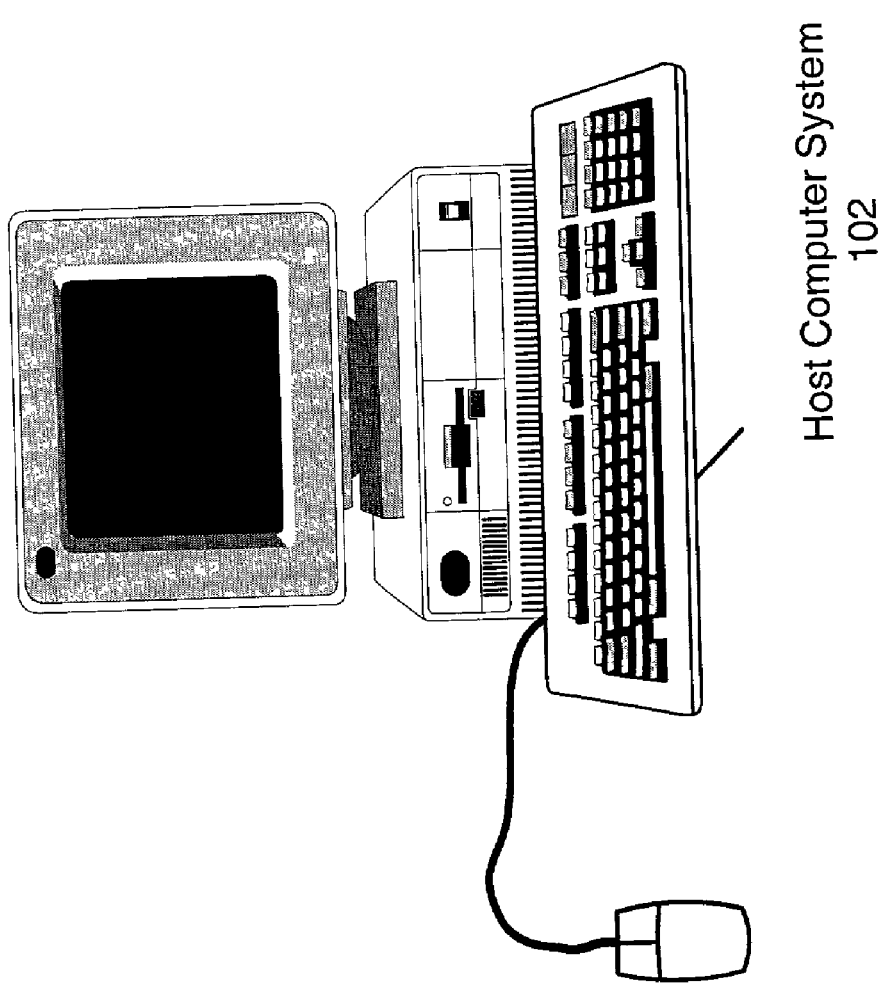
FIG. 1, illustrates a computer system suitable for implementing the present invention, according to one embodiment.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

FIG. 1—Computer System

FIG. 1 illustrates an exemplary computer system suitable for implementing various embodiments of the invention. The computer system 102 may store and/or execute a software program which performs the method described in FIG. 3A–FIG. 7 below. In one embodiment, the computer system 102 may include a display device, such as a monitor, as well as a chassis and one or more I/O devices, such as a keyboard and/or mouse. However, the computer system may take any of various forms, such as a personal computer, or any type of device which includes a processor that executes instructions from a memory medium, or which includes programmable logic that has been configured to perform the methods described in FIGS. 3A and 3B. Exemplary computer systems include a personal computer, mainframe computer, a personal computing device (PDA), television, embedded device, and other systems. Thus, as used herein, the term computer system is intended to encompass any of various devices which include a processor that can execute instructions from a memory medium and/or may include a programmable logic device that can be configured to execute a method or algorithm, such as that described in FIG. 3A–FIG. 7. It should be noted that in one embodiment, the computer system 102 may also be coupled to a network, such as the Internet, and may be operable to send and receive data to and from other systems on the network.

Thus, the method of the present invention may be implemented in any of various types of devices and any of various types of applications. Example applications where the method described herein may be used include instrumentation systems, industrial automation or process control systems, telecommunication systems, machine vision systems and any other application where it is desirable to determine a curve fit for a data set. More specific applications wherein the method of the present invention may be used include analysis related to image data such as edge detection, measurement data, acoustic data, seismic data, financial data, stock data, futures data, business data, scientific data, medical data, insurance data, musical data, biometric data, and telecommunications signals, among others.

Figure 2:
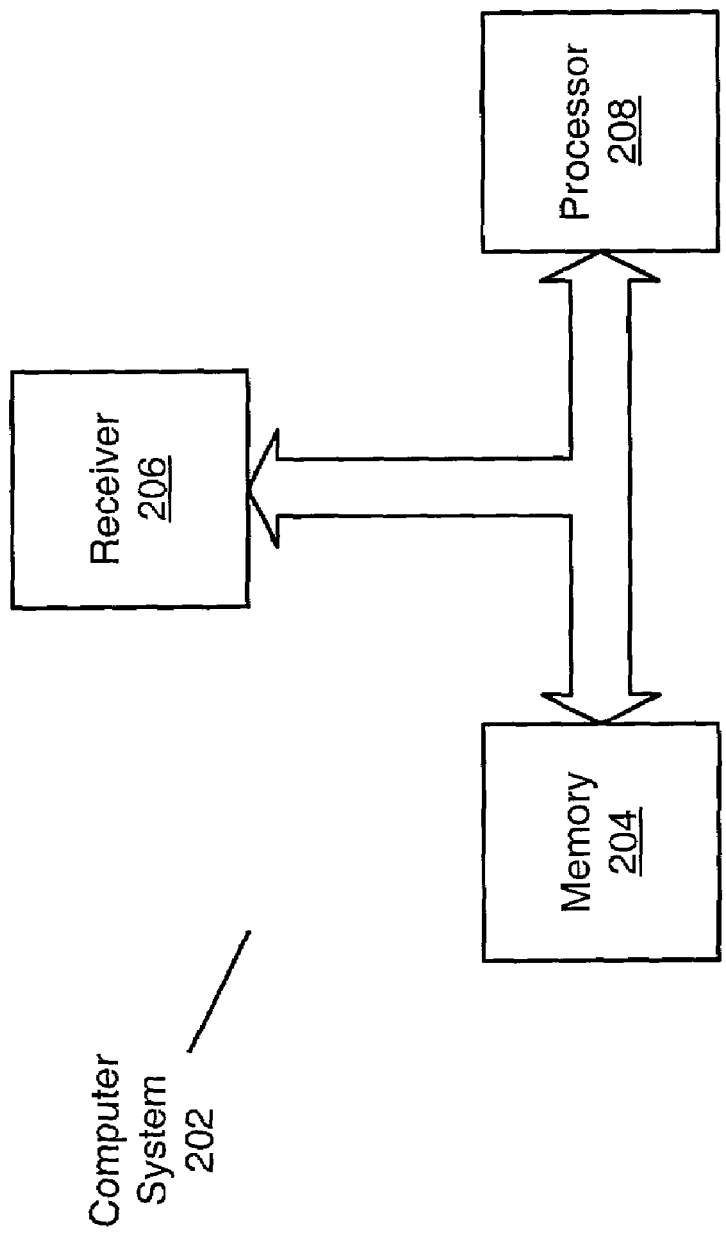
FIG. 2 is a block diagram of a computer system, according to one embodiment of the present invention.

FIG. 2—Computer System Block Diagram

The computer system shown in FIG. 2 is an exemplary embodiment, including a processor 208 which is operable to execute program instructions, a memory medium 204 which is operable to store program instructions and data, and a receiver 206 which is operable to receive signals or data from an external source. FIG. 2 is an exemplary block diagram of the computer system illustrated in FIG. 1, such as may be used to perform any of the methods shown in FIGS. 3A and 3B. It is noted that any type of computer system configuration or architecture can be used in conjunction with the system and method described herein, as desired, and that FIG. 2 illustrates a representative PC embodiment. It is also noted that the computer system may be a computer implemented on a VXI card installed in a VXI chassis, a computer implemented on a PXI card installed in a PXI chassis, or other types of embodiments. The elements of a computer not necessary to understand the present invention have been omitted for simplicity. The computer 102 may have various other components, such as one or more buses, a power supply, I/O devices, chipset logic, or other components as is conventional in various types of computer systems.

Figure 3:
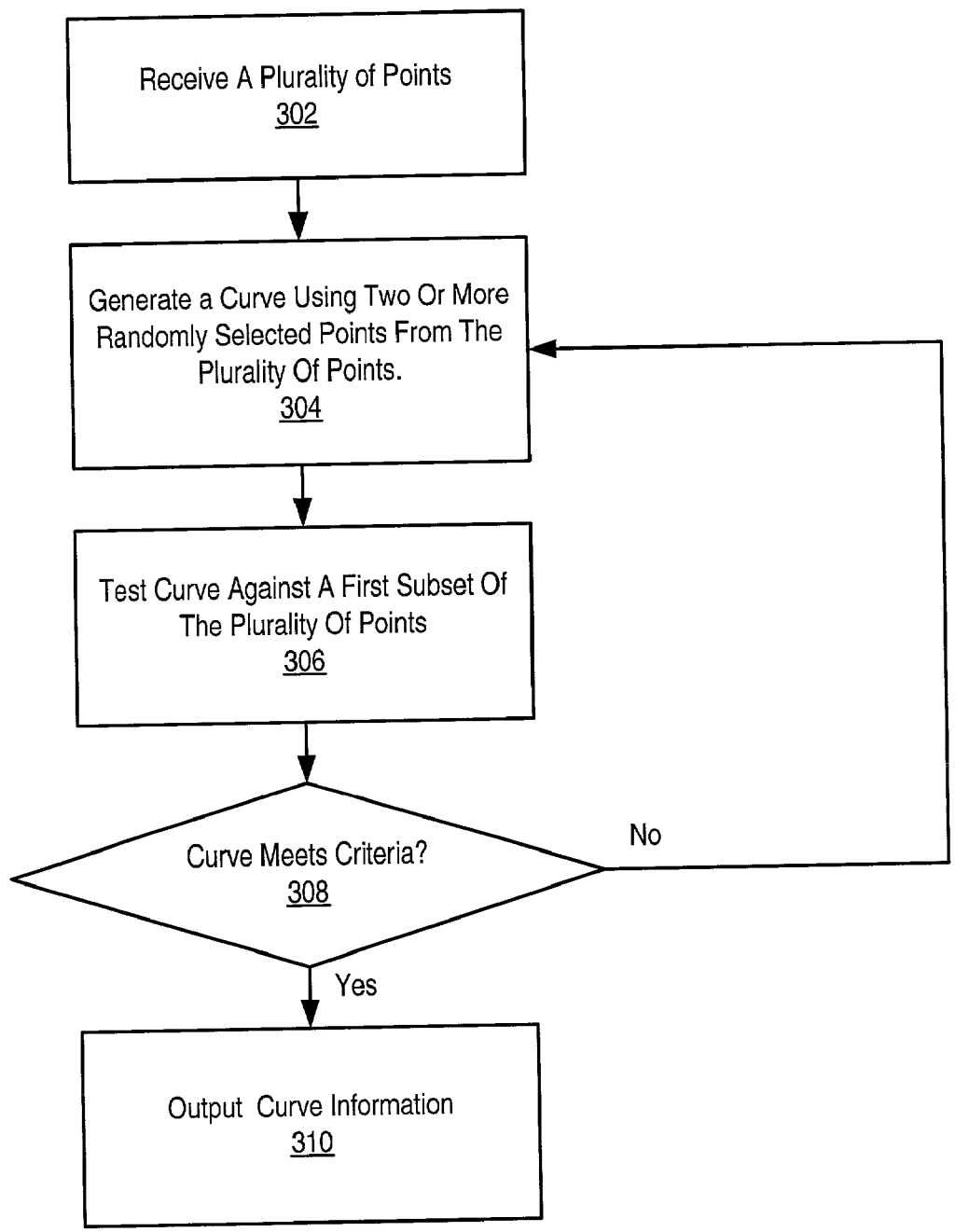
FIG. 3 flowcharts a curve fitting process, according to one embodiment.

FIG. 3—Flowchart of a Curve Fitting Process

FIG. 3 flowcharts a curve fitting process according to one embodiment of the invention. It should be noted that in various embodiments one or more steps may be performed in a different order than shown, or may be omitted, as desired. Additional steps may also be performed as desired.

As FIG. 3 shows, in 302 a plurality of points may be received. Then, in 304 a curve may be generated using two or more randomly selected points from the plurality of points. For example, in one embodiment, two points may be randomly selected, and a line may be generated from the two selected points.

In 306, the generated curve may be tested against a first subset of the plurality of points, generating first test results. For example, in one embodiment, the first plurality may comprise 30% of the plurality of points. In the preferred embodiment, testing the generated curve against the first subset of the plurality of points comprises determining an orthogonal distance from each point in the first subset to the generated curve, and comparing the determined distance to a specified radius, e.g., a pixel radius. In one embodiment, the first subset of the plurality of points may be randomly selected from the plurality of points. In one embodiment, the first subset of the plurality of points may comprise all, or substantially all, of the plurality of points.

In 308, the test results of 306 may be checked against first criteria. Said another way, the generated curve may be checked against the first criteria.

If the test results do not meet the first criteria, then in one embodiment, the method may return to step 304, and continue as described above in an iterative fashion. If the test results do meet the first criteria, then in 310 output may be generated comprising information regarding the generated curve. In one embodiment, the first criteria may comprise a number of points in the first subset of the plurality of points within the specified radius of the curve meeting or exceeding a threshold. For example, the number of points within the radius of the curve may meet or exceed a specified fraction of the subset, e.g., 40%.

It should be noted that as used herein, the term "random" may refer to any of various methods whereby data may be selected or processed in a non-sequential manner, such as random, pseudo-random, grid-sampling, or any other sampling method. In one embodiment, the received plurality of points may be randomized prior to iterating steps 304–307, generating a randomized list. In this embodiment, selecting a random subset may be accomplished simply by traversing the randomized list. In one embodiment, the process of random point selection may be further randomized by selecting a random starting position in the randomized list, and traversing the randomized list beginning at the random starting position.

In one embodiment, information regarding the generated curve may include one or more parameters defining the generated curve, and/or an optimal data set comprising data points in the plurality of data points which are within the specified radius of the curve.

It should be noted that in one embodiment, the method may also include performing a refined curve fit using the output information generated in 310 above, to further improve the accuracy of the curve fit. One embodiment of such a refined curve fit is described below with reference to FIG. 5B.

Figure 4:
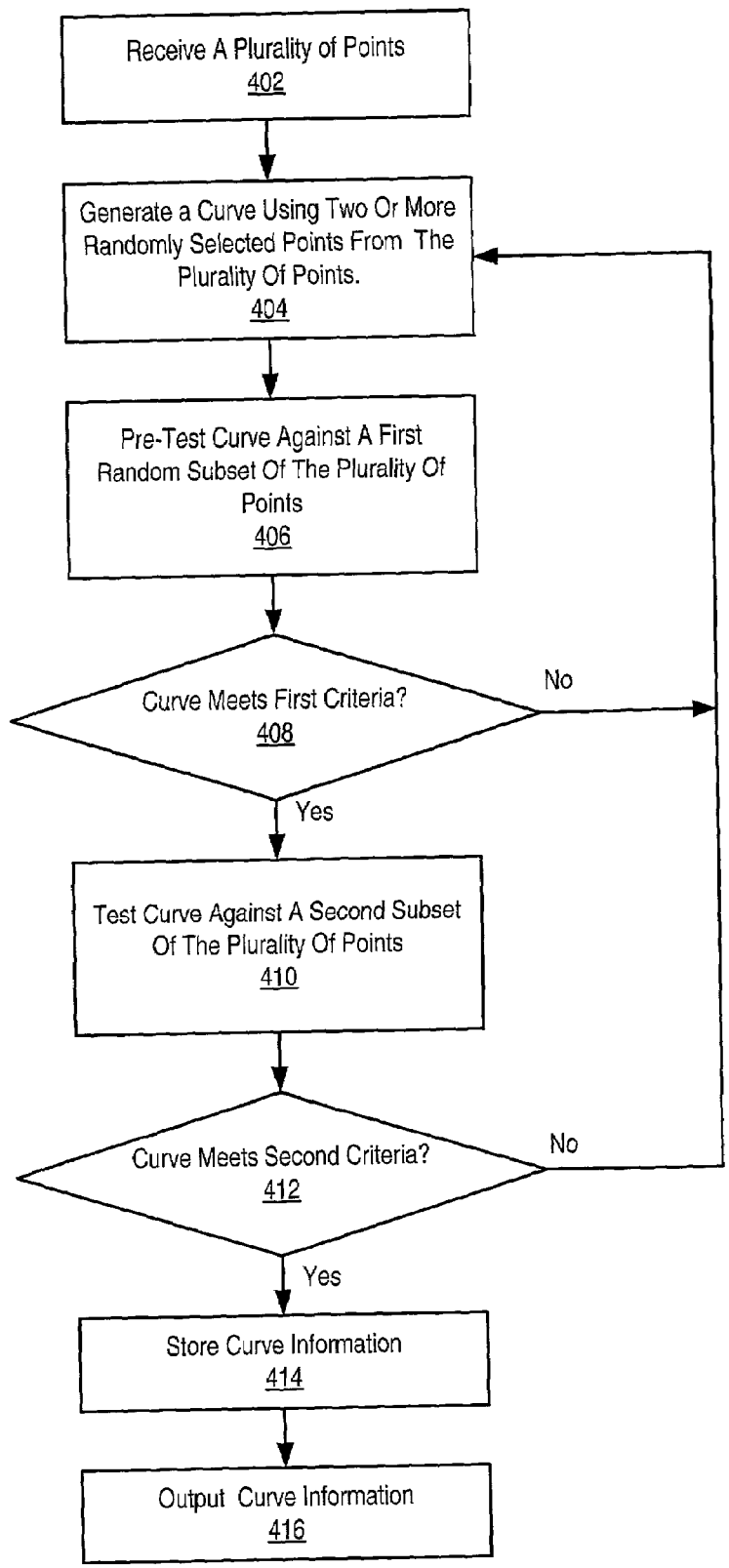
FIG. 4 flowcharts a curve fitting process, according to another embodiment.

FIG. 4—Flowchart of a Curve Fitting Process

FIG. 4 flowcharts a curve fitting method, according to one embodiment of the invention. The method presented with reference to FIG. 4 is similar to that described above with reference to FIG. 3, but with the addition of a pre-test phase which may greatly enhance the performance of the method. It should be noted that in various embodiments one or more steps may be performed in a different order than shown, or may be omitted, as desired. Additional steps may also be performed as desired.

As FIG. 4 shows, in 402 a plurality of points may be received. Then, in 404 a curve may be generated using two or more randomly selected points from the plurality of points. In 406, the generated curve may be pre-tested against a first subset of the plurality of points (e.g., 30% of the plurality of points), generating first test results. For example, an orthogonal distance from each point in the first subset to the generated curve may be determined, and compared to a specified radius, e.g., a pixel radius. The first test results may comprise the number of points in the first subset which are within the radius of the curve, i.e., which are "close" to the curve. As noted above with reference to FIG. 3, the first subset may be randomly selected from the plurality of points.

In 408, the first test results of 406 may be checked against first criteria, and if the first test results do not meet the first criteria, then the method may return to step 404 and continue as described above in an iterative fashion.

If the first test results do meet the first criteria, e.g., the number of points in the first subset which are close to the curve meets or exceeds a first threshold value, then in 410 the curve may be tested against a second subset of the plurality of points, generating second test results. Similar to the first test described above, in one embodiment, in the second test an orthogonal distance from each point in the second subset to the generated curve may be determined, and compared to the specified radius, e.g., the pixel radius. The second test results may comprise the number of points in the second subset which are within the radius of the curve, i.e., which are close to the curve.

In 412, the second test results may be checked against second criteria, and if the second test results do not meet the second criteria, then the method may return to step 404 and continue as described above in an iterative fashion.

In one embodiment, the second criteria may comprise the number of points in the second subset which are within the radius of the curve determined in the current iteration exceeding the number of points in the second subset which are within the radius of the curve determined in previous iterations. In one embodiment, the second subset may comprise substantially data points which are not in the first subset. In one embodiment, the second test results may comprise substantially all the data points of the plurality of data points which are within the specified radius of the curve. In the preferred embodiment, the first subset is smaller than the second subset, and so by pre-testing each generated curve against a smaller subset before testing against the larger subset, bad curves may be discarded early in the process, substantially improving performance.

If the second test results do meet the second criteria, then in 414 information regarding the curve may be stored.

In one embodiment, after the information regarding the curve is stored in 414, then in 416, output may be generated comprising the stored information.

In one embodiment, the process described above in 404–414 may continue iterating until third criteria are met. For example, in one embodiment, the third criteria may comprise one or more of the number of iterations meeting or exceeding an iteration threshold, and a number of data points of the plurality of data points within a specified radius of the curve meeting or exceeding a specified minimum value. When the third criteria are met, then the output may be generated, as indicated in 416. In one embodiment, information regarding the generated curve may include one or more parameters defining the generated curve, and/or an optimal data set comprising data points in the plurality of data points which are within the specified radius of the curve. In another embodiment, outputting information may comprise displaying the generated curve on a display device. As mentioned above, in various embodiments, the curve may comprise any of a number of forms, including a line, a circle, and an ellipse, among others.

As noted above, the term "random" may refer to any of various methods whereby data may be selected or processed in a non-sequential manner, such as random, pseudo-random, grid-sampling, or any other sampling method. As described above, in one embodiment, the received plurality of points may be randomized prior to iterating steps 404–407, generating a randomized list. In this embodiment, selecting a random subset may be accomplished simply by traversing the randomized list. The process of random point selection may be further randomized by selecting a random starting position in the randomized list, and traversing the randomized list beginning at the random starting position.

It should be noted that in one embodiment, the plurality of data points may comprise pixels of an image, and the curve fitting methods described above may operate to perform edge detection on the image.

It should also be noted that in one embodiment, the method may also include performing a refined curve fit using the output information generated in 416 above to further improve the accuracy of the curve fit. One embodiment of such a refined curve fit is described below with reference to FIG. 5B.

Figure 5A:
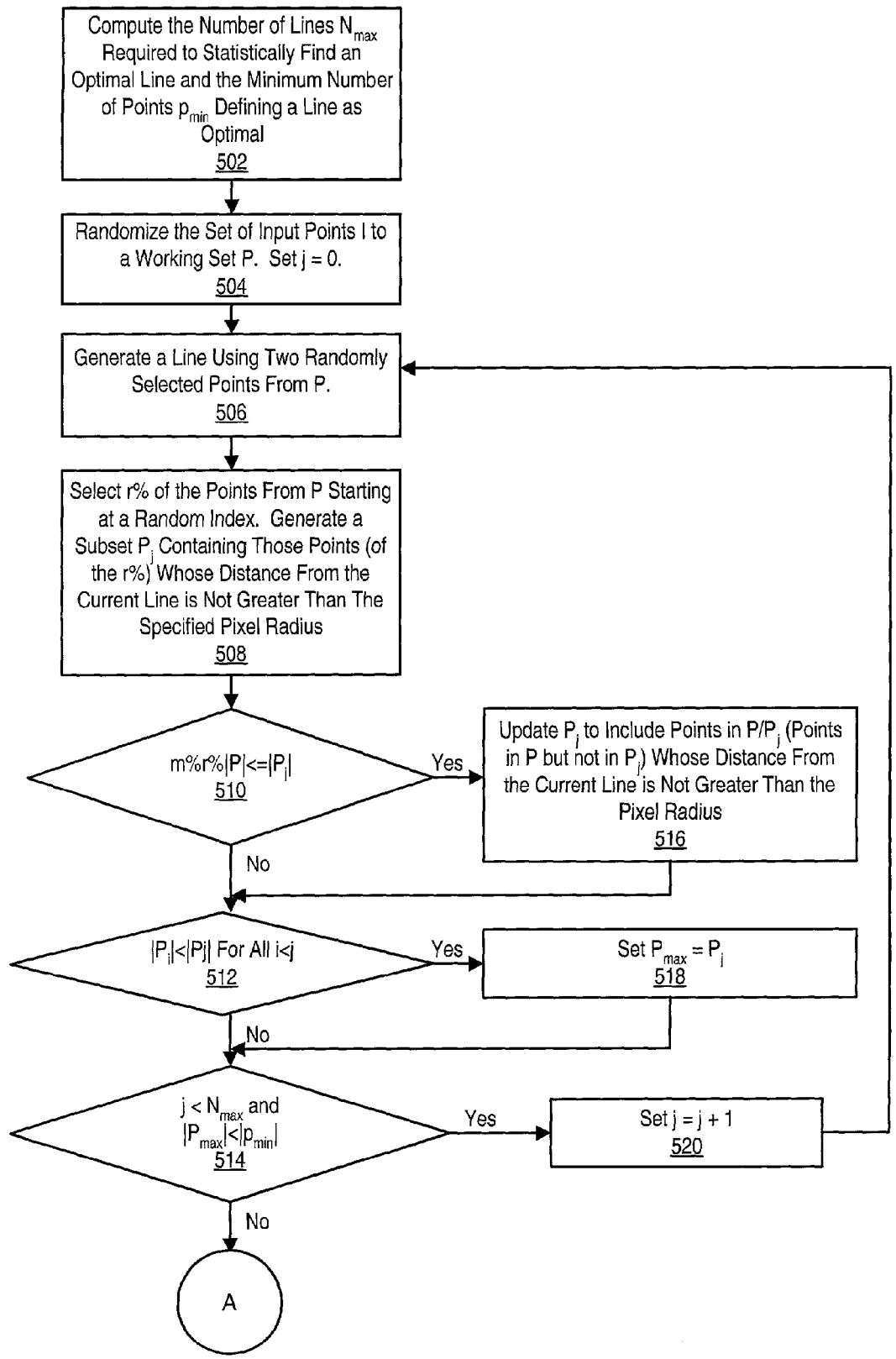
FIGS. 5A and 5B flowchart a curve fitting process, according to one embodiment.
Figure 5B:
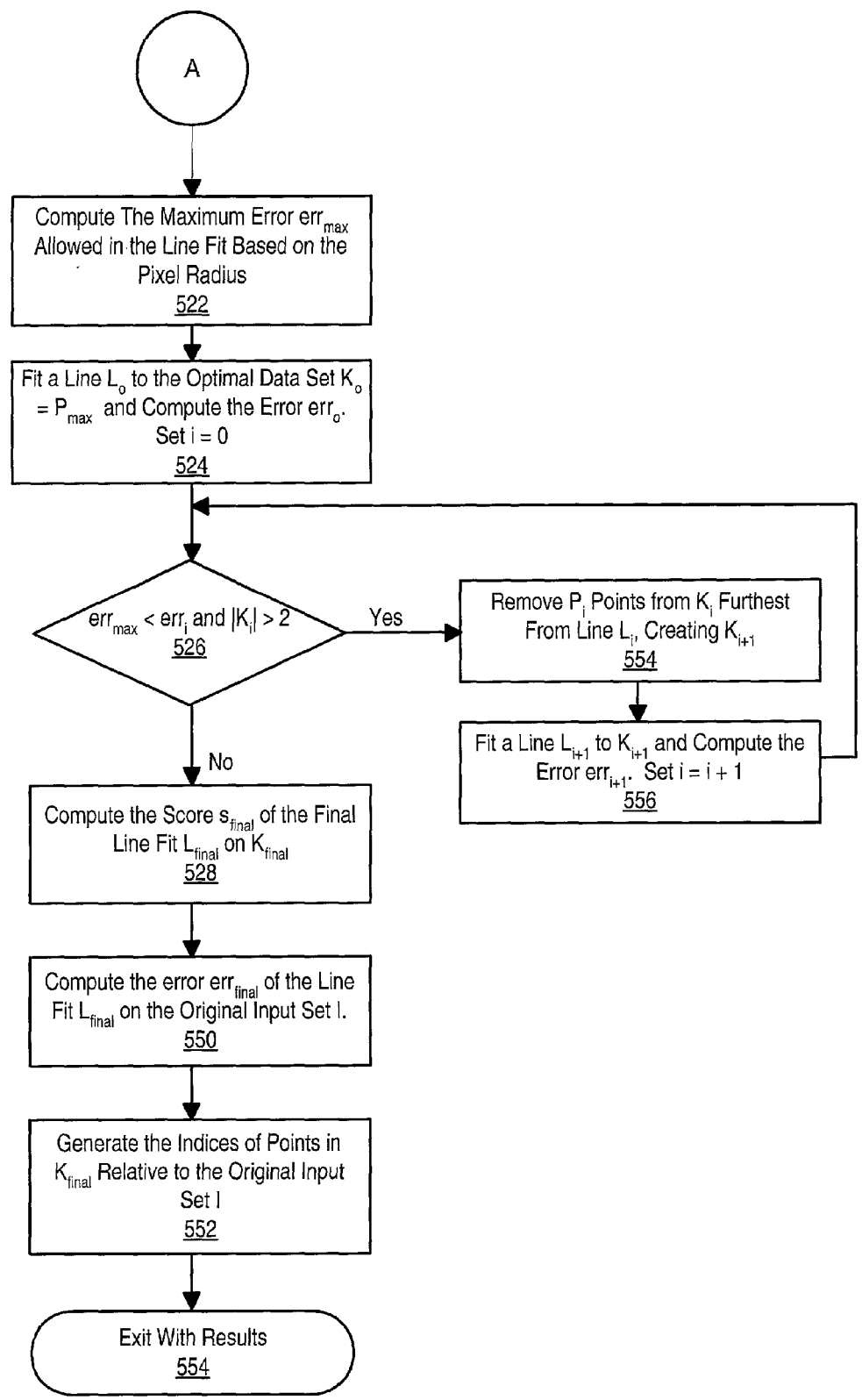

FIGS. 5A and 5B—Detailed Flowchart of a Curve Fitting Process

FIGS. 5A and 5B flowchart a curve fitting process, wherein an optimal curve is found for a received input data set, according to one embodiment. It should be noted that in various embodiments one or more steps may be performed in a different order than shown, or may be omitted, as desired. Additional steps may also be performed as desired. In one embodiment, the method is implemented in two phases. In the initial phase, an attempt is made to find a subset $P_{max}$ of a set of input points I which represents an optimal curve. This phase is based on a statistical model which assumes (when the curve is a line) that after trying at most $N_{min}$ random lines, each connecting a randomly selected pair of points from the input set, one of the lines will, in fact, pass close enough (within a specified radius) to a subset $P_{max}$ of the input points. The subset $P_{max}$ may then be used in the second phase of the process, described below. Note that as used herein, the term "optimal" refers to an acceptable solution, but not necessarily the best, or "optimum" solution. As in other Las Vegas or Monte Carlo methods, a number of possible solutions are selected randomly, tested against some criteria, and the best selected as the solution. It should be noted that as used herein, the term "random" may refer to any of various methods whereby data may be selected or processed in a non-sequential manner, such as random, pseudo-random, sampling, such as grid-sampling, low-discrepancy sequences, among others.

The second phase in the process is a more rigorous process which computes a refined curve fit (as specified by the user) to a subset of $P_{max}$. It should be noted that the flowcharts of FIGS. 5A and 5B illustrate one embodiment of the method in which the curves comprise lines. This is not meant to limit the method to any particular curves or dimensionality. As mentioned above, in one embodiment, the method may be used for edge detection in a received image, wherein each data point is an image pixel, the specified radius is a pixel radius, and the resulting fitted curve comprises an edge in the image.

As FIG. 5A shows, in 502 a minimum number of lines $N_{min}$ needed to statistically find an optimal line may be calculated, along with a minimum number of points $p_{min}$ defining a line as optimal. These parameters may provide reasonable limits on the process run time, while also providing reasonable assurance that an acceptable answer will be produced, described below in 514. In one embodiment, $N_{min}$=max(16, 10%*(0.5*|I|*(|I|−1))), 2). In one embodiment, $p_{min}$=m %*r %*|I| where m=40 and r=30. It should be noted that in various other embodiments, different values or means of calculating $N_{min}$ and $p_{min}$ may be used. It should also be noted that in various embodiments, the method may also include receiving the input data set, e.g., an image comprising a plurality of pixels.

In the preferred embodiment, the statistical model entails that the selection of the lines be random. To facilitate this need, in 504, the input set I may be randomized to produce a randomized working set P, which may then be used throughout the rest of the process (although its random nature is not necessary nor a hindrance for the second phase). In the preferred embodiment, after the input data set has been randomized, e.g., in the form of randomized set or list P, a starting position may be selected at random. This step provides an extra randomizing influence to reinforce the neutrality or lack of bias in the statistical model. In another embodiment, an input set P may be received and randomized in situ, obviating the need for a working copy or index buffer.

In 506, two or more points may be selected from the data set P to generate a curve, e.g., two points (or pixels) may be selected to generate a line. In a preferred embodiment, the two or more points may be selected randomly. In one embodiment, where the random starting position has been selected, as in 504 above, the two or more points may be randomly selected simply by selecting the next two or more sequential points from the data set or list P, beginning at the random starting position. In other embodiments, the generated curve may comprise a circle, an ellipse, or some other non-linear curve, in which case the two or more points (or pixels) selected may be greater than two. In the preferred embodiment, generating the curve may comprise calculating two or more parameters defining the curve. For example, in the case of a line, the coefficients a, b, and c from the equation of a line ax+by+c=0 may be calculated.

In 508 a subset $P_m$ of P may be selected, where $P_m$ comprises M data points, and tested against the generated line. In the preferred embodiment, the subset $P_m$ of P may be selected randomly. As described above, in an embodiment where the set P has been randomized and a random start position selected, the selection of random points from P may be made simply by traversing the list P sequentially, maintaining a current position in the list. This technique substantially increases the performance of the method. In other embodiments other methods of selecting the subset $P_m$ may be used as desired. In one embodiment, where $p_{min}$=m %*r %*|I| and m=40 and r=30, as described above in 502, the size of subset $P_m$ may be r % of the size of P, thus, for r=30, the subset $P_m$ comprises 30% of the points of P. A distance from each point of $P_m$ to the line may then be determined, producing a subset $P_j$ of $P_m$, where $P_j$ comprises J data points in $P_m$ whose distance from the line is less than or equal to a specified radius. For example, in the edge detection application, a number of pixels in the subset ($P_m$) whose distance from the curve is less than or equal to a specified pixel radius may be determined. In the preferred embodiment, the distance determined is the shortest distance from a given point to the line (or curve). In one embodiment, the resulting subset $P_j$ may be recorded.

In 510, the size of the subset $P_j$ may be compared to the size of the input set P. In one embodiment, the comparison may involve comparing size of the subset $P_j$ to a specified fraction of the size of $P_m$, where |$P_m$|=r %|P|. For example, as shown in 510, in one embodiment the size of $P_j$, |$P_j$|, may be compared to m %r %|P|, where m and r are described above in 508. Said another way, a ratio of J to M may be calculated and compared to a threshold value. Thus, a metric, such as a relative size of the number of points in $P_j$ compared to the size of the input data set P, may be determined, checked against specified criteria, and used to control the process, as described below. In one embodiment, the calculated metric for each subset of the plurality of $P_n$ pixels may comprise a ratio of $P_j$ to $P_m$, and the specified criteria may comprise the ratio having a value which meets or exceeds a threshold, e.g., m*r. In another embodiment, the calculated metric for each subset of the plurality of $P_n$ pixels may comprise a ratio of $P_m$ to $P_j$, and the specified criteria may comprise the ratio having a value which does not meet or exceed the threshold.

In 516, if the ratio of J to M exceeds the threshold (e.g., m), i.e., if J exceeds some specified fraction of M, then the recorded subset $P_j$ (and its size, J) may be updated to include all points in P whose distance from the line is less than or equal to the specified radius. In other words, if the fraction of points (or pixels) in the subset $P_m$ which are within the specified (pixel) radius of the line exceeds the threshold, then the remainder of the points in P (i.e., those points or pixels in P which are not in $P_m$) may be tested against the line, and those found to be within the specified (pixel) radius added to $P_j$. Thus, subset $P_m$ may be used as a pre-test for the line before testing all the points or pixels in P against the line. Said another way, if the fraction of points (or pixels) in the subset $P_m$ which are within the specified (pixel) radius of the line exceeds the threshold, then a number of pixels $P_k$ in the plurality of $P_n$ pixels whose distance from the curve is less than or equal to the specified pixel radius may be determined.

In 512, the size of the updated $P_j$, i.e., the updated J, may be compared to previous values of J computed in previous iterations, and if the current J is the greatest, i.e., if J exceeds all values of J calculated in previous iterations, then in 518 a subset $P_{max}$, may be set to the updated subset $P_j$, where $P_{max}$ comprises $J_{max}$ (the updated value of J) data points. Said another way, if $P_k$ meets or exceeds values of $P_k$ from previous iterations, the method may set a value $P_{max}$ to $P_k$, and record the $P_k$ pixels. Additionally, the two or more parameters defining the curve may be recorded, where the curve comprises an estimated fit to the plurality of data points, P. In one embodiment, two index buffers may be used where one stores the indices of points in $P_{max}$ and the other holds the indices of points in the current $P_j$. These buffers can be interchanged via accessor pointers which may switch buffers once $P_j$ exceeds $P_{max}$ without copying data from one to the other.

Then, in 514 a test may be made for criteria to end the iteration. In one embodiment, the test may include the number of iterations meeting or exceeding an iteration threshold and/or the value of $J_{max}$ meeting or exceeding a minimum point count. In one embodiment, the iteration threshold may comprise the minimum number of curves $N_{min}$, described above in 502. In one embodiment, the minimum point count may comprise $p_{min}$, also described above in 502. And so, the iteration may be stopped when either enough lines have been generated that an acceptable solution may be expected, or when a candidate solution (subset $P_{max}$) contains more than the minimum number of points $p_{min}$ required to describe an optimal curve or line.

If the end criteria are not met, then as indicated in 520, the process may repeat, selecting a new two or more points from P to generate a new line, selecting a new subset $P_m$ to pretest against the line, and so on, until the end criteria are met. When the end criteria are met, output may be generated comprising the subset $P_{max}$ and the calculated parameters defining the corresponding curve as an estimated curve fit to the set P. In one embodiment, the output may be stored for later use. In another embodiment, generating the output may include displaying the generated curve, e.g., the detected edge in an image, on a display device.

Thus, in the above process, a random line may be chosen from a set of points P. A randomly chosen subset of points in P may be tested against the line and if the number of "close" points exceeds some threshold, then the remainder of points in P may be tested against the line. Note that an input point is considered 'close' to the line (and placed in $P_j$) if its shortest distance to the line is not greater than a specified radius, a value specified by the user representing how far a point or pixel can be from the line to be considered 'fittable'. Because the distance operation is the most expensive, only a portion, e.g., r %, of points are tried for each random line, and only if some fraction of those points, e.g., m %, are close and are placed in $P_j$, then the rest of the points in P are tried for that line in an attempt to produce an optimal subset $P_j$. In this fashion, the number of distance computations are reduced. After each line is checked, if it is the best (largest) subset generated so far then the current results ($P_j$) are stored (in $P_{max}$) and a determination is made as to whether trying another line is necessary. It should be noted that in the preferred embodiment, all subsets of P are created via an indexing buffer so that no ancillary copies of the data are required. Thus, the $P_j$s and $P_{max}$s are simply referenced from P using this buffer.

In one embodiment, the output of the initial phase described above may itself be used as a good estimated strong curve fit to the data. However, by using a refined fitting technique in the second phase of the process, the quality of the estimate may be increased substantially.

FIG. 5B flowcharts the refined fitting phase of the process, according to one embodiment. The embodiment described in the flowchart relates to fitting a line to the data, e.g., finding a straight edge in an image, although in other embodiments more complex curves may be fit. In the second phase the method receives the subset of points or pixels $P_{max}$ generated in the first phase, and operates to iteratively cull outliers from the subset with respect to a succession of optimal curves or lines fit to the modified subset, as described below. A refined curve fit may thus be performed on the subset of data points or pixels $P_{max}$, generating a refined curve or edge, which may be output along with a final modified (culled) subset $K_{final}$ of $P_{max}$. In one embodiment, there are two stopping conditions for the iteration. The first is based on the fact that a perfect line fit will occur on a set of only two points, thus, when the subset is reduced to the minimum points required to form the curve (e.g., the two points required to define a line), the iteration is stopped. The second condition uses the user specified pixel radius and a requested fit score to generate a threshold error condition, $err_{max}$. In one embodiment, the score is given in the range [0, 1000] in which a higher the score implies a better fit.

As FIG. 5B shows, in 522 the maximum error $err_{max}$ allowed in fitting a curve to the data may be computed. In the preferred embodiment, $err_{max}$ is determined based upon the specified radius, or pixel radius. For example, in one embodiment, $err_{max}=(1-minscore/1000)*radius^2*|P_{max}|$, where minscore comprises the user specified "tolerance" for the curve fit. Note that the square of the pixel radius may be used to avoid computing the square root of the error in each sequential 2D line fit.

In 524, an optimal data set $K_0$ may be initialized to $P_{max}$ and a line $L_0$ may be fit to the data points (e.g., pixels) in $K_0$. An error $err_0$ may be computed for the fit. The line $L_0$ and the data set $K_0$ may be used as initial values for the iterative process, described below, in which one or more outliers of $K_i$ are removed based upon line $L_i$ in each iteration i.

In 526, stopping conditions may be tested to determine whether to stop the iteration. As mentioned above, in the preferred embodiment, the stopping conditions include a current error $err_i$ (which is $err_0$ on the first iteration) exceeding the maximum error $err_{max}$, and the size of $K_i$, $|K_i|$, reaching a minimum number of points or pixels $N_c$ required to define the curve, or in the case of a line, a value of two. Said another way, the iteration may continue while $err_{max}<err_i$, and $|K_i|>N_c$ (e.g., 2). The iterated steps comprise the stopping condition check 526, as well as processing steps 534 and 536, described below.

If the stopping conditions are not met, then in 534, $P_i$ points or pixels which are furthest from the line $L_i$ may be removed from $K_i$, resulting in a new subset of data points or pixels, $K_{i+1}$. In a preferred embodiment, $P_i$ may have a value of one, such that in each iteration, the furthest point in $K_i$ from line $L_i$ is removed. In one embodiment, where index buffers are used, and where $P_i=1$, the removal of the point or pixel may be accomplished by swapping the point to be removed with the last valid point in $K_i$. Note that this is actually swapping indices and not actual point values which minimizes data movement. In addition, this approach maintains linear access in the following set $K_{i+1}$ and keeps the removed points (via their indices) at the tail of the buffer.

In one embodiment, $P_i$ may be calculated using the size of $K_i$. For example, $P_i$ may be some percentage of $K_i$, such as 10%. Thus, the value of $P_i$ may change over the iterations of the process.

In 536, a new line $L_{i+1}$ may be fit to $K_{i+1}$, and a corresponding error, $err_i$ may be calculated for the fit. The iteration variable i may then be incremented, such that $L_{i+1}$ and $K_{i+1}$ become the new $L_i$ and $K_i$, respectively.

In a preferred embodiment, the fit of the new line $L_{i+1}$ to $K_{i+1}$, may be performed as an incremental fit, wherein information from the previous iteration's fit is used to avoid calculating the new fit from scratch. This technique may improve the performance of the method substantially. For example, in the case of a line, MORE HERE (FROM DARREN SCHMIDT) Note that computing the coefficients of a true 2D line fit is much more expensive than an artificial 2D line fit, which is commonly used. The artificial version computes errors based only in the y-direction while the true fit incorporates x-directional error as well. In the preferred embodiment of the present method a complete line fit to the data is only computed once at the very beginning of the process. For each iteration that removes points or pixels, the numerical components in the line fit corresponding to those points or pixels are removed and the error of the new line fit is re-computed. This reduces the computation requirements of later fits to a trivial amount.

The process then returns to 526 described above to test for further iterations and steps 534 and 536 are repeated until the stopping conditions of 526 are met.

When the ending conditions are met in 526, then in 528 the iteration may be stopped and a score $s_{final}$ of a final curve $L_{final}$ on a final subset $K_{final}$, may be calculated, where $L_{final}$ and subset $K_{final}$ comprise final states of $L_i$ and $K_i$, respectively. In one embodiment, the score of the last (final) line fit may be computed as: $1000*(1-err_{last}/err_{max})$, where $err_{last}$ is the calculated error of $L_{final}$ on the final subset $K_{final}$. As noted above, the score represents the quality of the line fit on the final subset of points $K_{final}$. The user may be provided the indices of these points to compute the error based only on these points if so desired. In addition, this allows for iteratively partitioning a set of points that represents multiple lines.

Then, in 530 an error $err_{final}$ of the curve $L_{final}$ on the plurality of data points P (or I) may be calculated. In one embodiment where indexing buffers are used to specify subsets, the indices of points in $K_{final}$ relative to the original input set I may be generated, as indicated in 532.

Finally, in 534 result output may be generated. In one embodiment, the result output may comprise one or more of the final subset $K_{final}$, the size of $K_{final}$, the curve $L_{final}$ (e.g., the detected edge), the score $s_{final}$, the error $err_{final}$, and the plurality of data points or pixels P. Note that the error $err_{final}$, is computed over the entire input set P (or I), not just the subset, $K_{final}$. In one embodiment, generating the result output may include displaying the result output on a computer display device. For example, in the edge detection application, the refined curve fit may be performed on the subset of pixels $P_{max}$, generating a refined curve comprising a detected edge in the image. The generated output may comprise information indicating the detected edge. For example, generating output may comprise displaying the detected edge on a computer display device.

It should be noted that in other embodiments, other methods for performing the refined curve fit may be used. For example, in one embodiment, performing the refined curve fit may comprise performing a mean squared error (MSE) curve fit.

Figure 6:
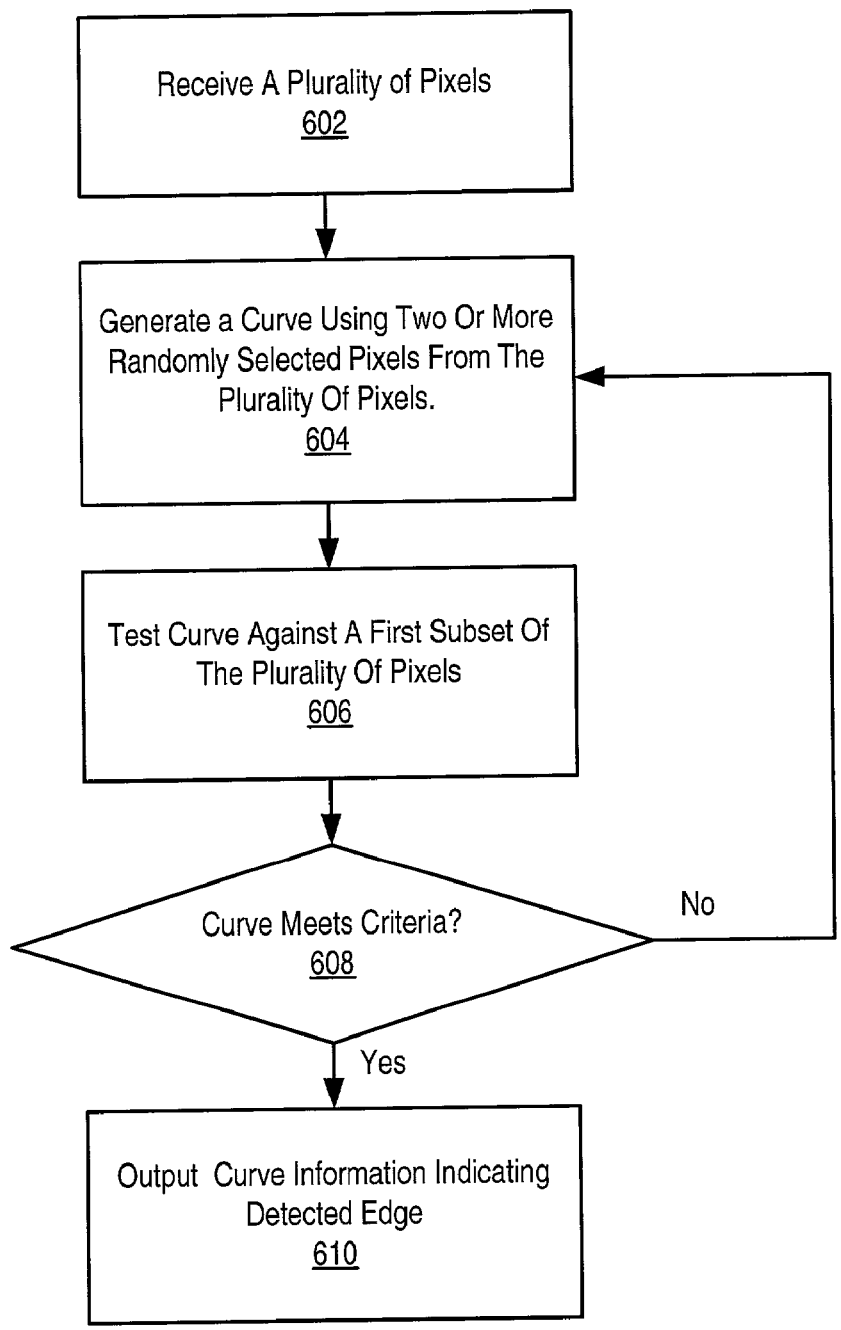
FIG. 6 flowcharts an edge detection process, according to one embodiment.

FIG. 6—Flowchart of an Edge Detection Process

FIG. 6 flowcharts a method for performing edge detection on an image, according to one embodiment of the invention. The method described with reference to FIG. 6 is substantially the method described above with reference to FIG. 3, wherein the data points are pixels in an image, and the fitted curve comprises a detected edge in the image. It should be noted that in various embodiments one or more steps may be performed in a different order than shown, or may be omitted, as desired. Additional steps may also be performed as desired.

As FIG. 6 shows, in 602 a plurality of pixels may be received, for example in an image. Then, in 604 a curve may be generated using two or more randomly selected pixels from the plurality of pixels. For example, in one embodiment, two pixels may be randomly selected, and a line may be generated from the two selected pixels.

In 606, the generated curve may be tested against a first subset of the plurality of pixels, generating first test results. For example, in one embodiment, the first plurality may comprise 30% of the plurality of pixels. In the preferred embodiment, testing the generated curve against the first subset of the plurality of pixels comprises determining an orthogonal distance from each pixel in the first subset to the generated curve, and comparing the determined distance to a specified pixel radius. In one embodiment, the first subset of the plurality of pixels may be randomly selected from the plurality of pixels. In one embodiment, the first subset of the plurality of pixels may comprise all, or substantially all, of the plurality of pixels.

In 608, the test results of 606 may be checked against first criteria. If the test results do not meet the first criteria, then in one embodiment, the method may return to step 604, and continue as described above in an iterative fashion. If the test results do meet the first criteria, then in 610 output may be generated comprising information regarding the generated curve, wherein the generated curve comprises a detected edge in the image. In one embodiment, the first criteria may comprise a number of pixels in the first subset of the plurality of pixels within the specified pixel radius of the curve meeting or exceeding a threshold. For example, the number of pixels within the radius of the curve may meet or exceed a specified fraction of the subset, e.g., 40%.

In one embodiment, the received plurality of pixels may be randomized prior to iterating steps 604–607, generating a randomized list, and so selecting a random subset may be accomplished simply by traversing the randomized list. In one embodiment, the process of random pixel selection may be further randomized by selecting a random starting position in the randomized list, and traversing the randomized list beginning at the random starting position.

In one embodiment, information regarding the generated curve may include one or more parameters defining the generated curve (the detected edge), and/or an optimal data set comprising pixels in the plurality of pixels which are within the specified pixel radius of the curve.

Figure 11:
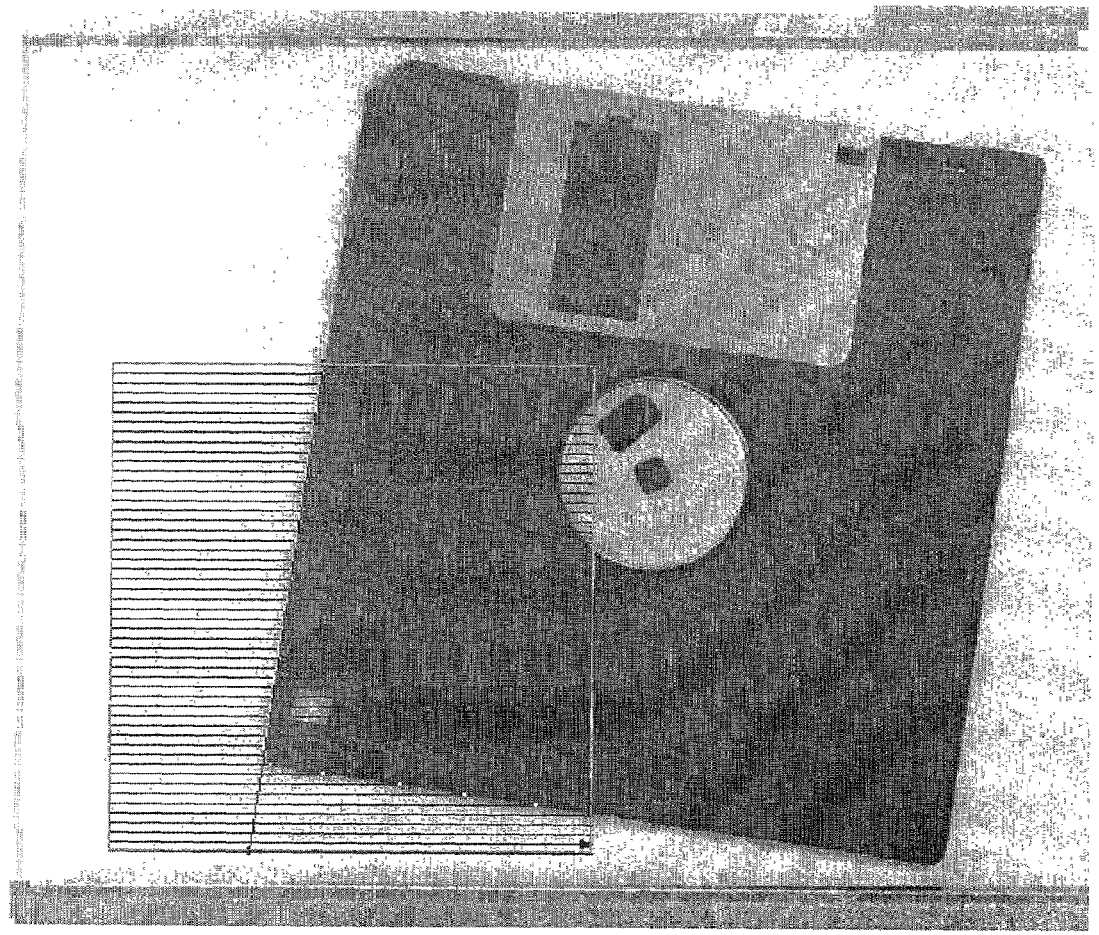
FIG. 11 illustrates an example of a detected edge in an image, according to one embodiment.

It should be noted that in one embodiment, the method may also include performing a refined curve fit using the output information generated in 610 above, to generate a refined detected edge. One embodiment of such a refined curve fit is described above with reference to FIG. 5B. A graphical example of edge detection in an image is shown in FIG. 11, described below.

Figure 7:
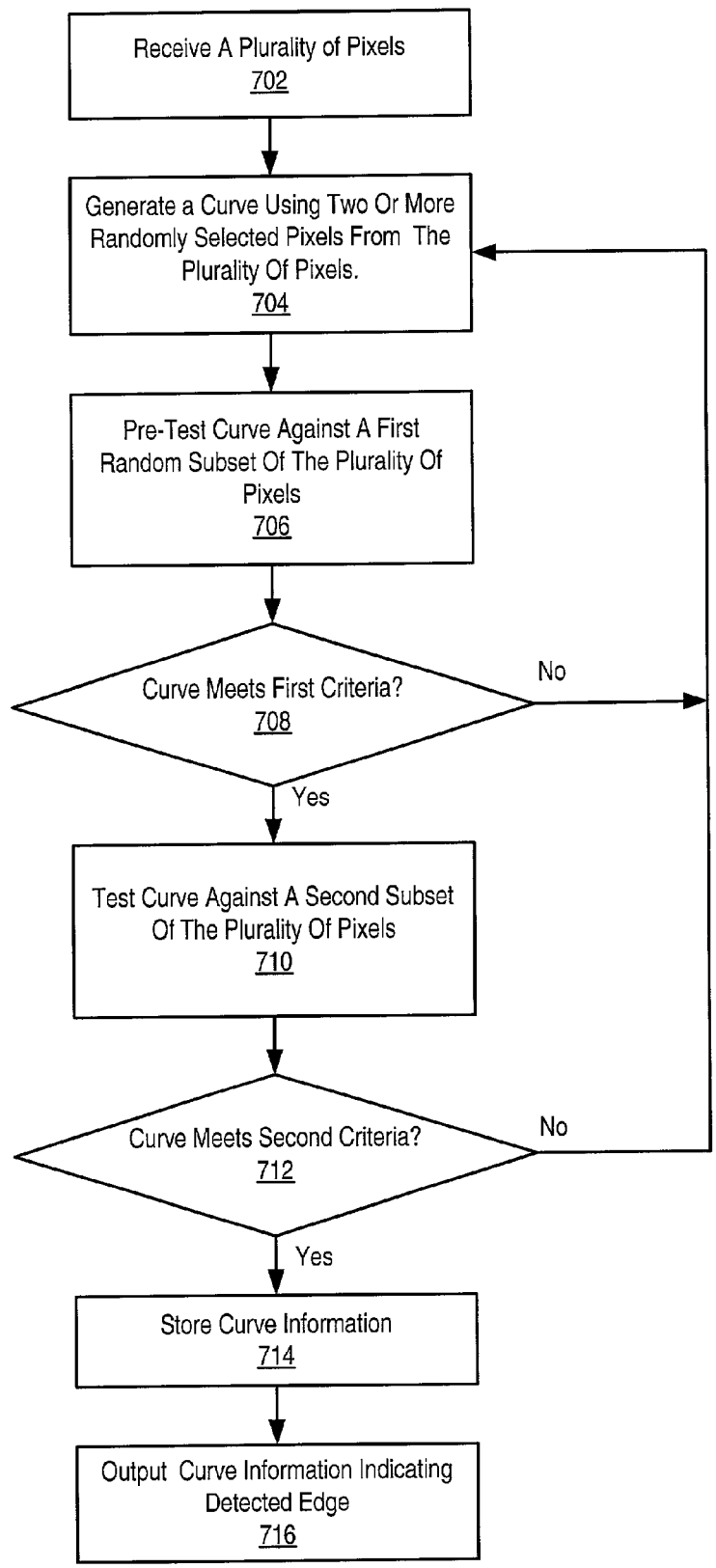
FIG. 7 flowcharts an edge detection process, according to another embodiment.

FIG. 7—Flowchart of a Curve Fitting Process

FIG. 7 flowcharts a method for performing edge detection on an image, according to one embodiment of the invention The method presented with reference to FIG. 7 is similar to that described above with reference to FIG. 6, but with the addition of a pre-test phase which may greatly enhance the performance of the method. It should be noted that in various embodiments one or more steps may be performed in a different order than shown, or may be omitted, as desired. Additional steps may also be performed as desired.

As FIG. 7 shows, in 702 a plurality of pixels may be received, such as from an image. Then, in 704 a curve may be generated using two or more randomly selected pixels from the plurality of pixels. In 706, the generated curve may be pre-tested against a first subset of the plurality of pixels (e.g., 30% of the plurality of pixels), generating first test results. For example, an orthogonal distance from each pixel in the first subset to the generated curve may be determined, and compared to a specified pixel radius. The first test results may comprise the number of pixels in the first subset which are within the pixel radius of the curve, i.e., which are "close" to the curve. In one embodiment, the first subset may be randomly selected from the plurality of pixels.

As noted above, the term "random" may refer to any of various methods whereby data may be selected or processed in a non-sequential manner, such as random, pseudo-random, grid-sampling, or any other sampling method. As described above, in one embodiment, the received plurality of pixels may be randomized prior to iterating steps 704–707, generating a randomized list. In this embodiment, selecting a random subset may be accomplished simply by traversing the randomized list. The process of random pixel selection may be further randomized by selecting a random starting position in the randomized list, and traversing the randomized list beginning at the random starting position.

In 708, the first test results of 706 may be checked against first criteria, and if the first test results do not meet the first criteria, then the method may return to step 704 and continue as described above in an iterative fashion.

If the first test results do meet the first criteria, e.g., the number of pixels in the first subset which are close to the curve meets or exceeds a first threshold value, then in 710 the curve may be tested against a second subset of the plurality of pixels, generating second test results. Similar to the first test described above, in one embodiment, in the second test an orthogonal distance from each pixel in the second subset to the generated curve may be determined, and compared to the specified pixel radius. The second test results may comprise the number of pixels in the second subset which are within the pixel radius of the curve, i.e., which are close to the curve.

In 712, the second test results may be checked against second criteria, and if the second test results do not meet the second criteria, then the method may return to step 704 and continue as described above in an iterative fashion.

In one embodiment, the second criteria may comprise the number of pixels in the second subset which are within the pixel radius of the curve determined in the current iteration exceeding the number of pixels in the second subset which are within the pixel radius of the curve determined in previous iterations. In one embodiment, the second subset may comprise substantially pixels which are not in the first subset. In one embodiment, the second test results may comprise substantially all the pixels of the plurality of pixels which are within the specified pixel radius of the curve. In the preferred embodiment, the first subset is smaller than the second subset, and so by pre-testing each generated curve against a smaller subset before testing against the larger subset, bad curves may be discarded early in the process, substantially improving performance.

If the second test results do meet the second criteria, then in 714 information regarding the curve may be stored, wherein the curve comprises a detected edge in the image.

In one embodiment, after the information regarding the curve is stored in 714, then in 716, output may be generated comprising the stored information. In one embodiment, the information regarding the generated curve may include one or more parameters defining the generated curve, and/or an optimal data set comprising pixels in the plurality of pixels which are within the specified pixel radius of the curve. In another embodiment, outputting information may comprise displaying the generated curve, i.e., the detected edge, on a display device. As mentioned above, in various embodiments, the curve/edge may comprise any of a number of forms, including a line, a circle, and an ellipse, among others.

In one embodiment, the process described above in 704–714 may continue iterating until third criteria are met. For example, in one embodiment, the third criteria may comprise one or more of the number of iterations meeting or exceeding an iteration threshold, and a number of pixels of the plurality of pixels within a specified pixel radius of the curve meeting or exceeding a specified minimum value. When the third criteria are met, the output may be generated, as indicated in 716.

It should also be noted that in one embodiment, the method may also include performing a refined curve fit using the output information generated in 716 above to generate a refined detected edge. One embodiment of such a refined curve fit is described above with reference to FIG. 5B.

The edge detection method described above may be operable to perform edge detection in a machine vision application. The fact that the method may be performed very quickly may allow its use in real-time, or near real-time, systems where prior approaches are not feasible.

Figure 8:
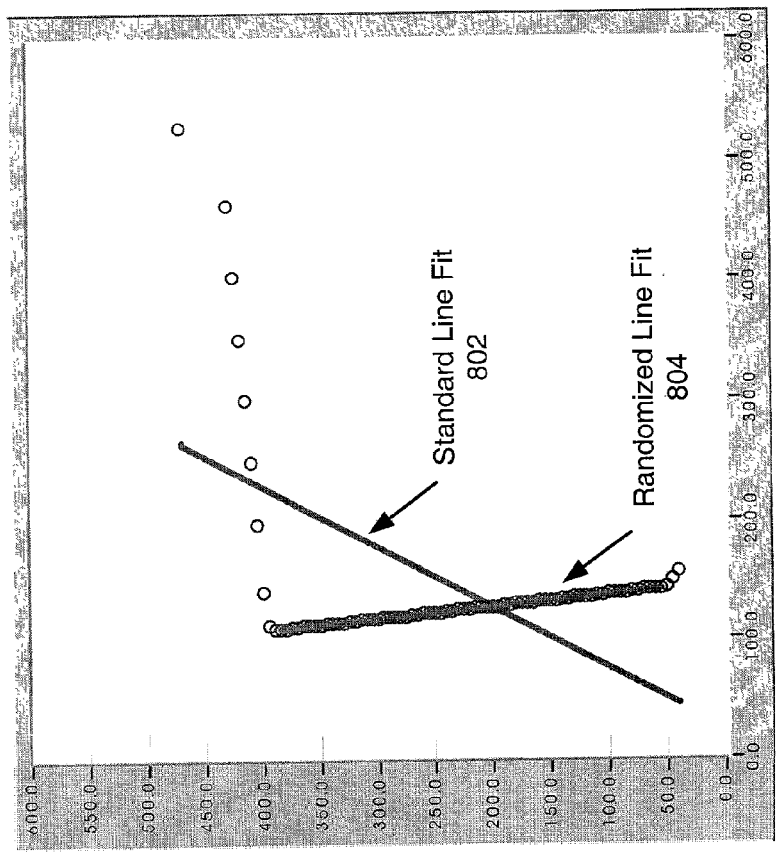
FIG. 8 illustrates a data set and two approaches to curve fitting, according to one embodiment.

FIG. 8: Data Set and Fitted Line Using Two Methods

A typical scenario that arises in image processing applications is presented in FIG. 8. Using edge detection, for example, a set of coordinate points containing several lines can be obtained. If a standard line fitting procedure is used in this set, a line 802 that represents the whole dataset will be obtained. The present method, on the other hand, may return the strongest line 804 in the set, overcoming the substantial amount of outliers present in the data. Thus, the present method may provide an efficient way to characterize clustered data, or data with a high noise content, such that outlying points may be ignored in fitting curves to the data.

In the preferred embodiment, the present method will always return a line such that at least half the points in the data set are within the specified distance from the estimated line, as defined by the pixel radius. If a set does not have any line that attends such criteria, the method attempts to return the best line found. The best line is the line that has the largest number of points within pixel radius distance.

An innovative statistical approach is used in the method to provide speed and accuracy in the line fitting. A statistical approach also means that in sets where the number of points in the strongest line is very small, a line other than expected may be returned. However, this line will have a number of close points very similar to that of the strongest line.

Various embodiments of the present invention provide the user with several customization options to modify the behavior of the method. In one embodiment, three control inputs to the method are: the minimum score, the pixel radius and the maximum number of iterations (i.e., the minimum number of lines, $N_{min}$).

The pixel radius defines what the method will consider to be a strong line. This number defines the distance (in pixels) that a point can be from the estimated line, to be counted as a valid point. The method tries to estimate a line such that a specified portion, e.g., at least half, of the points in the set are valid points. If a set does not have such a line, the method attempts to return the estimated line that has the most number of valid points.

Increasing the pixel radius increases the distance a point can be from the line. Typically, the imaging system resolution and the amount of noise in a system can be used to determine this parameter. If the resolution of the imaging system is very high, the pixel radius should be small, otherwise outliers may be used to estimate the line. If the noise is very high, a higher pixel radius guarantees that more points will be included in the line estimation, providing a more balanced fit.

The minimum score provides a control for the user to further improve the quality of the estimated line. Once the method has found the subset of points $P_{max}$ within the defined pixel radius from the line to be estimated, outlying points may be iteratively removed in the fitting process. In each iteration the point(s) most distant from the fitted line may be removed and the line fit recomputed. Thus having a very high minimum score may allow the user to have a very accurate line through the points used to fit. For example, combining a large pixel radius and a large score may produce an accurate fit in a very noisy data set, while a small pixel radius and a low score may produce a robust fit in a standard data set. The score represents the error convergence ratio (the ratio between the initial error, represented by using all the points within pixel radius from the estimated line, and the desired final error).

The maximum number of iterations $N_c$ sets a limit in the search for the minimum score. Thus if the maximum number of iterations is reached, but the algorithm has not obtained a line that attends the desired minimum score, the method stops and returns the current line. A standard line fit can be performed by setting the maximum number of iterations value to 0.

Theory

The basis of various embodiments of the present invention is a randomized Las Vegas algorithm, which implies that in average a smaller number of operations will be needed to obtain the same result as in a non randomized fashion. In the worst case the number of operations needed may be as many as, or even more than, in the non-randomized counterpart. Also, in such an algorithm the deviation from the mean should be small.

In a typical inspection application, such as floppy disk gauging, the input point set P has on the order of 100–1000 points. These sets also have most of the points belonging to a line due to the process that generates them.

Clusterization or Hough Transform based algorithms have complexity $O(N^2)$, where N is the number of points. Usually the constant defining the complexity bound is large. Moreover, the implementation of these procedures is not straightforward, requiring extensive access to memory and non-standard operations. These characteristics make these classes of algorithms inadequate for real time high performance inspection tasks. In fact, in certain gauging applications the clustering process could be the major bottleneck of the operation.

Referring again to FIG. 8, which illustrates a commonly encountered data set in image processing applications, a line 802 fitting the complete data set is depicted. The outliers can be defined as the points that do not belong to the strongest line. Notice that in the presented set the outliers have enough weight to severely skew the mean squared estimated line 802.

In the proposed problem there are clearly two classes of points: points that belong to a line and outlier points. A point belongs to a line if it is within a certain distance from the strongest line in the set. The strongest line in the set can be defined as the line that has the most number of points belonging to it. Theorem 1 presents an interesting result that can be used as the basis for building a randomized strategy.

Theorem 1 Consider a set of points P with N points such that M points of the set belong to the strongest line. Then if L independent points are randomly chosen, then the probability that all points belong to the strongest line is given by $$\left( \frac{\prod_{i=0}^{L-1}(M-i)}{\prod_{i=0}^{L-1}(N-i)} \right).$$

If L<<M, the probability can be approximated by $$\left(\frac{M}{N}\right)^L.$$

Proof: The L points can be chosen from M points in C(M, L) ways, where $$C(m, n) = \frac{m!}{(m-n)!n!}.$$

The total number of choices is C(N, L). The probability can be trivialy derived.

Using Theorem 1 it is clear that if L=2 and (M/N)>0.5, the probability that both points belong to the strongest line is at least 0.25. Two points are sufficient to define a line in a two-dimensional space. Based on this observation a randomized line fitting algorithm can be constructed. This algorithm is shown in Algorithm 1, below.

---
Algorithm 1 Simplified Random Line Fit
---

```
GenerateNormalizedLineParams(Iparams, ptA,ptB)
{
dX = ptA.x - ptB.x; dY = ptA.y-ptB.y;
invNorm = 1.0/sqrt(dX*dX+dY*dY);
Iparams.a = dY * invNorm;
Iparams.b = -dX*invNorm;
Iparams.c = -(Iparams.a*ptA.x+Iparams.b*ptA.y);
}
SimpleRandomFit(P, fitLineParameters, distanceThs, strongLineRatio)
{
stop = false;
numMaxRejectPts = (1-strongLineRatio)*size(P);
trials=0;
while (not(stop) AND (trials < maxTrials)) {
    GenerateRandomPair(p,q);
    //Grab points from set P
    ptA=P(p); ptB=P(q);
    Iparams = GenerateNormalizedLineParams(ptA,ptB);
    numRejectPts=0; ptIndex=0; setToStart(storePtIndex);
    while((ptIndex < (size(P)-1)) AND
    (numRejectPts<numMaxRejectPts)) {
       if(DistanceLinetoPt(Iparams,P(ptIndex)) > distanceThs)
          numRejectPts++;
       else
          ++storePtIndex = ptIndex;
       increment(ptIndex);
    }
    stop = numRejectPts<numMaxRejectPts;
    trials++;
```

---
Algorithm 1 Simplified Random Line Fit
---

```
}
fitLineParameters = FitLineTo(storePtIndex, P);
}
```

The simplified algorithm can be used for line fitting problems in two dimensional space. It is a Las Vegas algorithm, because eventually a suitable line will be found. As will be shown later, the worst case scenario can require more computational effort than a clusterization algorithm. But in general, the average case scenario tends to be much better, and the simple structure of the algorithm allows for a very efficient implementation.

The simplified random line fitting algorithm has two important parameters: the distance threshold, or pixel radius, and the strong line ratio. The strong line ratio is equivalent to the ratio M/N presented in Theorem 1, and defines the minimum number of points that should belong to a strong line. The algorithm will return any line that attends such condition. The distance threshold (radius) is the distance that defines if a point belongs to a line. For the algorithm to return a line parametrization a minimum number of points within the distance threshold should exist.

Theorem 2 computes the average computation involved in the algorithm SimpleRandomFit. An important implication of the theorem is that the algorithm is more efficient than usual clustering techniques if M>√N. For example, when M=0.5N, this condition holds.

Theorem 2 The average number of scalar products involved in the algorithm Simplified Random Line Fit is approximately $N^3/M^2$, where N and M are defined as in Theorem 1. If M=kN, where 0<k<1, the algorithm has order O(N).

Proof: The proof is trivial. Notice that the probability of selecting the strongest line is given by Theorem 1 by setting L=2. The inverse of the probability is the average number of lines that need to be checked until a strong line is discovered. Each test involves computing N scalar products.

Although the proposed algorithm provides a very efficient line fitting procedure on average, in some situations an excessive number of computations may be performed. Assume a situation where M=0.5N. In this case, on average, 3 out of 4 times, N scalar products are computed for a line that is invalid. It would be interesting and useful to include a condition that would avoid excessive computation when a bad line is selected.

The Random Line Fit algorithm is such an algorithm. It is basically the same algorithm as Simplified Random Line Fit, but includes another layer of randomized testing that promotes the reduction of excessive computation for bad lines. For each line, using a subset of the complete set, the process essentially checks if the ratio of valid points to total points is close enough to the true ratio. Notice that the points are pre-shuffled, saving computation on each loop.

---
Algorithm 2 Random Line Fit
---

```
RandomLineFit(P,
fitLineParameters, distanceThs, strongLineRatio,subsetThsRatio,
                firstPassSizeRatio) {
    numberOfPoints = size(P);
    subsetSize = round(firstPassSizeRatio*numberOfPoints);
```

-continued

Algorithm 2 Random Line Fit

```
numberOfValidPoints = 0;
trials = 0;
RandomizePoints(points, numberOfPoints);
do {
  GenerateRandomLine(P, numberOfPoints, &lineParams);
  Increment(trials);
  //Check a subset of the total set
  numberOfValidPoints =
  CheckSubsetPoints(lineParams, P, distanceThs,
           subsetSize,indiceOfValidPoints);
  if(numberOfValidPoints >= subsetThsRatio*subsetSize) {
    numberOfValidPoints+=CheckRemainingPoints(lineParams, P
           distanceThs,indiceOfValidPoints);
    //If a better solution was found
    if(bestFoundNumberAccepted < numberOfValidPoints) {
      bestFoundNumberAccepted = numberOfValidPoints;
      bestLineParams = lineParams;
      bestIndiceValidPoints = indiceOfValidPoints;
    }
  }
}while
((numberOfValidPoints < StrongLineRatio*numberOfPoints)AND
         (trials<Max_Trials));
//if desired a MSE fit can be done, but is not required.
FitSetPointsMSE(points, bestIndiceValidPoints,&lineParams)
}
```

An important question regards how many points Q should be chosen so that the first layer test proposed in the algorithm is effective. If too few points are chosen, the subset may not reflect the true ratio between valid and invalid points. On the other hand, if too many points are chosen, there is no real advantage in using the first layer test. Besides determining the size Q (firstPassSizeRatio), the threshold probability q (subsetThsRatio) should also be chosen. Setting it to the ratio M/N might not be the best choice.

Theorem 3 can be used to calculate the probability that a subset of size Q, will reflect the true ratio between valid and invalid points, given M and N. The value of R should be simply set to MQ/N. Unfortunately there is no trivial approximation for the desired probability.

Theorem 3 Consider again a set of points P with N points such that M points of the set belong to the strongest line. Consider that Q independent points are chosen. The probability that at least R<Q points belong to the strongest line is given by $$\frac{\sum_{i=R}^{Q} C(M, i)C(N-M, Q-i)}{C(N, Q)}.$$

Proof: The total number of ways the N points can be chosen is C(N,Q). At least R points should belong to the strongest line, and the number of ways M points can be chosen so that the statement is true is C(M,i), for every i in the range {R, . . . , Q}. For each such choice, the remaining Q−i points can be chosen from the N−M points that do not belong to the line. Thus the total number of ways points can be chosen such that at least R points belong to the strongest line is $$\sum_{i=R}^{Q} C(M, i)C(N-M, Q-i).$$

Figure 9:
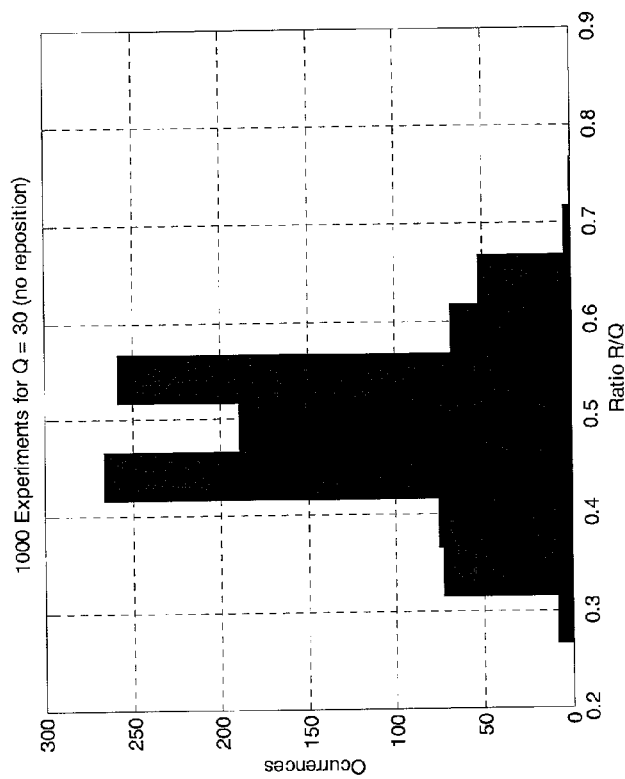
FIG. 9 illustrates a probability distribution for a subset of a data set defining a strong line, according to one embodiment.

FIG. 9—Probability of a Subset Defining a Strong Line

Consider a typical scenario, where at least 50% of the points in a set define a strong line (strongLineRatio 0.5). A simple computer experiment may be done to observe the behavior of the subset Q specified in Theorem 3. From a set of 100 points labeled as belonging or not belonging to the strong line, Q points are picked without reposition. The distribution of the ratio R/Q is shown in FIG. 9 for Q=30, when the experiment is repeated 1000 times. In 975 of those experiments, the ratio R/Q is at least 50%. Thus, about 60% of the time, if the set size is Q=30, an experiment in a subset of the total number of points will reflect the result of the experiment in the complete set. For the algorithm Random Line Fit this implies that 40% of the times a line will be automatically rejected, regardless of it being a strong line.

The probability threshold q can be set to a smaller value than the strongLineRatio. For the example under discussion, if this threshold is set at 40%, then 91.8% of the subsets will have the ratio R/Q equal to or greater than this value. But in this case, some lines that are not strong may be accepted to the second testing phase. This phenomenon is very similar to selecting the threshold in a signal detection problem. The threshold defines the probabilities of false acceptance and positive rejection. The more sensitive the detector, the higher the chance of a false acceptance. Conversely, lower sensitivities increase the probability of a positive rejection.

Figure 10C:
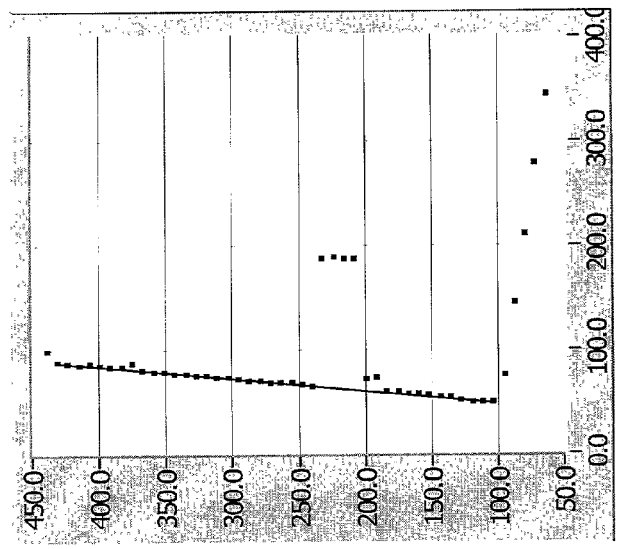
FIGS. 10A–10C illustrate examples of strong line fits to data with substantial outliers according to one embodiment of the invention.
Figure 10B:
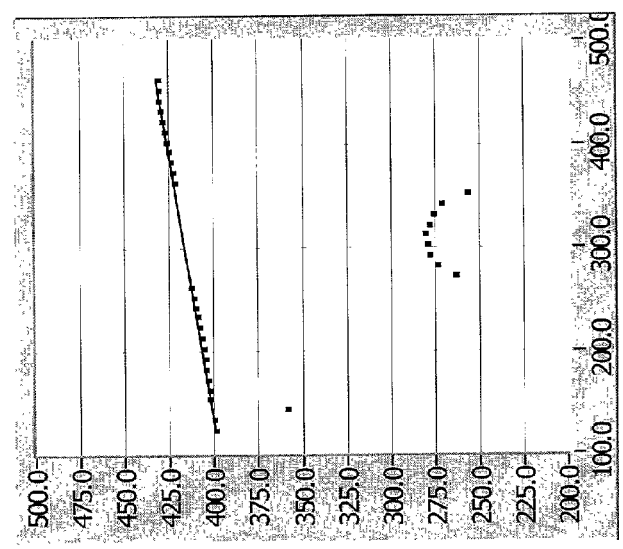
Figure 10A:
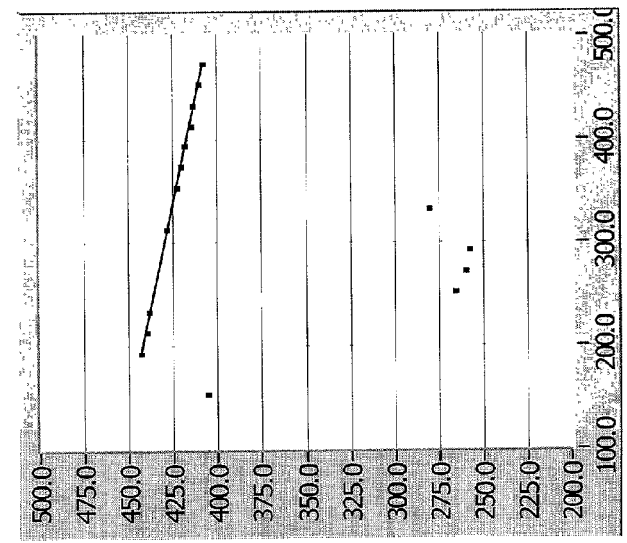

FIGS. 10A–10C—Example Data Sets with Strong Line Fits

FIGS. 10A–10C illustrate examples of strong line fits to data with substantial outliers according to one embodiment of the invention. In each case, the outlying points are numerous enough, and far enough away from the main group, that standard line fitting techniques, such as Least Mean Squares, will not fit the data properly. As FIGS. 10A and 10B show, outlying clusters of points may be ignored entirely by the method, allowing the well-behaved data to be fit closely.

FIG. 10C illustrates a more complex issue. There are three point sets which could each form a line in their own right. As FIG. 10C shows, the method correctly selects the group with the greatest population and fits it accurately.

Thus, various embodiments of the method described herein provide an efficient and fast means for fitting noisy data by characterizing a strong curve for the data set. Additionally, the method is tunable by the user to accommodate different data characteristics.

FIG. 11—Example of Edge Detection in an Image

FIG. 11 illustrates edge detection in an image, as performed by one embodiment of the invention. As FIG. 11 shows, an area of interest has been horizontally gridded to determine a group of edge points. More specifically, edge points along the left-most and bottom borders of the disk image have been determined, as shown. The method then operates to determine the strongest line fitting the points, as described above with reference to FIG. 6, where the strongest line comprises a detected edge, as shown. In one embodiment, after this edge has been detected and characterized, the points comprised in the detected edge may be removed from consideration, and the remainder of the data may be processed to discover or detect other edges in the image, and so on until the image has been characterized to the extent desired.

Memory and Carrier Medium

The computer system 102 preferably includes a memory medium on which software according to an embodiment of the present invention may be stored. The memory medium may store the set of data points I, as well as various index buffers or working copies of I, as needed. In one embodiment, the set of data points comprises pixels in an image. The memory medium may also store a software program for processing and/or analyzing the set of data points as described with reference to FIGS. 3A and 3B.

The term "memory medium" is intended to include an installation medium, e.g., a CD-ROM, floppy disks, or tape device; a computer system memory or random access memory (RAM) such as DRAM, SRAM, EDO RAM, RRAM, etc.; or a non-volatile memory such as a magnetic media, e.g., a hard drive, or optical storage. The memory medium may comprise other types of memory as well, or combinations thereof.

In addition, the memory medium may be located in a first computer in which the software program is stored or executed, or may be located in a second different computer which connects to the first computer over a network, such as the Internet. In the latter instance, the second computer provides the program instructions to the first computer for execution. Also, the computer system 102 may take various forms, including a personal computer system, mainframe computer system, workstation, network appliance, Internet appliance, personal digital assistant (PDA), television set-top box, or other device. In general, the term "computer system" can be broadly defined to encompass any device having at least one processor which executes instructions from a memory medium, or any device which includes programmable logic that is configurable to perform a method or algorithm.

Various embodiments further include receiving or storing instructions and/or data implemented in accordance with the foregoing description upon a carrier medium. Suitable carrier media include a memory medium as described above, as well as signals such as electrical, electromagnetic, or digital signals, conveyed via a communication medium such as networks and/or a wireless link.

In one embodiment, the software programs as described herein may be designed for use in machine vision systems, including systems which perform data acquisition/generation, analysis, and/or display, or for use in automation systems. In particular, the method is applicable to problems of edge detection in images. In other embodiments, the software programs may be designed for use in business, financial, scientific, biometric, or medical analysis, among others, as well as in instrumentation systems, industrial automation or process control systems, telecommunication systems, and any other application where it is desirable to determine a best fit curve for a data set. More specific applications wherein the method of the present invention may be used include analysis related to image data, measurement data, acoustic data, seismic data, financial data, stock data, futures data, business data, scientific data, medical data, insurance data, musical data, biometric data, and telecommunications signals, among others.

Thus, the method of the present invention may be implemented in any of various types of devices and any of various types of applications. However, it is noted that the present invention can be used for a plethora of applications and is not limited to the applications shown herein. In other words, the applications described herein are exemplary only, and the methods described herein may be used for any of various purposes and may be stored in and execute on any of various types of systems to perform any of various applications.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A computer-implemented method for performing edge detection in an image comprising a plurality of pixels, the method comprising:
   a) storing the plurality of pixels in a memory of a computer;
   b) generating a curve based on two or more random pixels of the plurality of pixels;
   c) testing the curve against a first subset of the plurality of pixels, wherein the first subset is less than all of the plurality of pixels, wherein said testing produces first test results;
   d) performing (b) and (c) a plurality of times to determine a curve which meets the first criteria, wherein said performing (b) and (c) a plurality of times comprises performing (b) and (c) in an iterative manner until ending criteria are met; and
   e) if said first test results meet first criteria, storing information regarding the curve, wherein the curve comprises a detected edge in the image.

2. The computer-implemented method of claim 1, wherein said ending criteria comprise one or more of:
   the number of iterations meeting or exceeding an iteration threshold; and
   a number of pixels of the plurality of pixels within a specified pixel radius of the curve meeting or exceeding a specified minimum value.

3. The computer-implemented method of claim 1, further comprising:
   pre-testing the curve against a second subset of the plurality of pixels, wherein the second subset is less than all of the plurality of pixels, wherein said testing produces second test results;
   wherein, if said second test results meet second criteria, then performing c)–e).

4. The computer-implemented method of claim 3, wherein the second subset is smaller than the first subset.

5. The computer-implemented method of claim 3, wherein the second subset is a random subset comprising randomly selected pixels from the plurality of pixels.

6. The computer-implemented method of claim 5, further comprising:
   randomizing the plurality of pixels after said storing to generate a randomized list of the plurality of pixels;
   wherein said randomly selected pixels from the plurality of pixels are selected by traversing the randomized list.

7. The computer-implemented method of claim 6, wherein said randomizing the plurality of pixels further comprises selecting a random starting position in the randomized list, and wherein said traversing the randomized list comprises traversing the randomized list starting at the random starting position.

8. The computer-implemented method of claim 3, wherein said pre-testing the curve against a second subset of the plurality of pixels comprises:

determining a number of the second subset of the plurality of pixels which are within the specified pixel radius of the curve;
wherein said second test results comprise said number of the second subset of the plurality of pixels which are within the specified pixel radius of the curve.

9. The computer-implemented method of claim 8, wherein said second criteria comprise said number of the second subset of the plurality of pixels which are within the specified pixel radius of the curve meeting or exceeding a threshold value.

10. The computer-implemented method of claim 8, wherein said second criteria comprise said number of the second subset of the plurality of pixels which are within the specified pixel radius of the curve meeting or exceeding a specified fraction of the second subset.

11. The computer-implemented method of claim 1, wherein said testing the curve against a first subset of the plurality of pixels comprises:
determining a number of the first subset of the plurality of pixels which are within the specified pixel radius of the curve;
wherein said first test results comprise said number of the first subset of the plurality of pixels which are within the specified pixel radius of the curve.

12. The computer-implemented method of claim 11, wherein said first criteria comprise said number of the first subset of the plurality of pixels which are within the specified pixel radius of the curve meeting or exceeding a specified fraction of the first subset.

13. The computer-implemented method of claim 1, wherein the first subset comprises substantially all of the plurality of pixels.

14. The computer-implemented method of claim 1, further comprising:
displaying the generated curve on a display device.

15. The computer-implemented method of claim 1, wherein the curve comprises one of a line, a circle, and an ellipse.

16. The computer-implemented method of claim 1, further comprising:
performing a refined curve fit, wherein the refined curve fit is performed using a second subset of the plurality of pixels comprising pixels within said specified pixel radius of the curve, wherein the refined curve fit comprises iteratively culling outlying pixels from the second subset, generating a culled subset of pixels, and fitting a refined curve to the culled subset at each iteration until an ending condition is met, wherein the refined curve fit generates a refined curve, and
generating and storing output, comprising one or more of information regarding the refined curve, and the culled subset of the plurality of pixels.

17. The computer-implemented method of claim 16, wherein said performing a refined curve fit comprises:
calculating a maximum error allowed for the refined curve fit based on the specified pixel radius;
removing one or more pixels from the second subset, wherein said one or more pixels are furthest from curve, thereby generating a culled subset;
fitting a curve to the culled subset;
calculating an error for the curve on the culled subset;
repeating said removing, said fitting, and said calculating one or more times to generate a refined curve; and
generating and storing result output, wherein said result output comprises one or more of:
the culled subset;
the refined curve, wherein the refined curve comprises a refined detected edge in the image;
the error for the curve on the culled subset;
a score, indicating the fitness of the refined curve with respect to the plurality of pixels; and
the plurality of pixels.

18. The computer-implemented method of claim 1, wherein the image has a dimensionality greater than two.

19. A memory medium operable to store program instructions for performing edge detection in a received image comprising a plurality of pixels, wherein the program instructions are executable to perform:
a) generating a curve based on two or more random pixels of the plurality of pixels;
b) testing the curve against a first subset of the plurality of pixels, wherein the first subset is less than all of the plurality of pixels, wherein said testing produces first test results;
c) performing (a) and (b) a plurality of times to determine a curve which meets the first criteria, wherein said performing (a) and (b) a plurality of times comprises performing (a) and (b) in an iterative manner until ending criteria are met; and;
d) if said first test results meet first criteria, storing information regarding the curve, wherein the curve comprises a detected edge in the image.

20. The memory medium of claim 19, wherein the program instructions are further executable to perform:
pre-testing the curve against a second subset of the plurality of pixels, wherein said testing produces second test results, wherein said second subset is a random subset comprising randomly selected pixels from the plurality of pixels, and wherein the second subset is less than all of the plurality of pixels;
wherein, if said second test results meet second criteria, then performing b)–d).

21. The memory medium of claim 20, wherein the program instructions are further executable to perform:
randomizing the plurality of pixels to generate a randomized list of the plurality of pixels;
wherein said randomly selected pixels from the plurality of pixels are selected by traversing the randomized list.

22. The memory medium of claim 20,
wherein said pre-testing the curve against a second subset of the plurality of pixels comprises determining a number of the second subset of the plurality of pixels which are within a specified pixel radius of the curve;
wherein said second test results comprise said number of the second subset of the plurality of pixels which are within the specified pixel radius of the curve;
wherein said second criteria comprise said number of the second subset of the plurality of pixels which are within the specified pixel radius of the curve meeting or exceeding a threshold value;
wherein said testing the curve against a first subset of the plurality of pixels comprises determining a number of the first subset of the plurality of pixels which are within the specified pixel radius of the curve;
wherein said first test results comprise said number of the first subset of the plurality of pixels which are within the specified pixel radius of the curve; and
wherein said first criteria comprise said number of the first subset of the plurality of pixels which are within the specified pixel radius of the curve meeting or exceeding a threshold value.

23. The memory medium of claim 19, wherein the program instructions are further executable to perform:
  performing a refined curve fit, wherein the refined curve fit is performed using a second subset of the plurality of pixels comprising pixels within said specified pixel radius of the curve, wherein the refined curve fit comprises iteratively culling outlying pixels from the second subset, generating a culled subset of pixels, and fitting a refined curve to the culled subset at each iteration until an ending condition is met, wherein the refined curve fit generates a refined curve, and
  generating output, comprising one or more of information regarding the refined curve, and the culled subset of the plurality of pixels, wherein the curve comprises a refined detected edge in the image.

24. A computer based system for performing edge detection in an image comprising a plurality of pixels, the system comprising:
  a CPU;
  a memory medium coupled to the CPU, wherein the memory is operable to store program instructions for performing edge detection, and wherein the CPU is operable to execute the program instructions; and
  an input which is operable to receive the plurality of pixels;
  wherein the program instructions are executable by the CPU to:
    a) generate a curve based on two or more random pixels of the plurality of pixels;
    b) test the curve against a first subset of the plurality of pixels, wherein said testing produces first test results;
    (c) perform (a) and (b) a plurality of times to determine a curve which meets first criteria, wherein said performing (a) and (b) a plurality of times comprises performing (a) and (b) in an iterative manner until ending criteria are met, and wherein said ending criteria comprise one or more of:
      the number of iterations meeting or exceeding an iteration threshold; and
      a number of pixels of the plurality of pixels within a specified radius of the curve meeting or exceeding a specified minimum value;
    d) said first test results meet first criteria, store information regarding the curve, wherein the refined curve comprises a detected edge in the image.

25. The system of claim 24, wherein the program instructions are further executable by the CPU to:
  after (a) and before (b), pre-test the curve against a second subset of the plurality of pixels, wherein said testing produces second test results, wherein said second subset is a random subset comprising randomly selected pixels from the plurality of pixels, and wherein the second subset is less than all of the plurality of pixels;
  wherein, if said second test results meet second criteria, then perform b)–d).

26. The system of claim 25, wherein the program instructions are further executable by the CPU to:
  randomize the plurality of pixels to generate a randomized list of the plurality of pixels;
  wherein said randomly selected pixels from the plurality of pixels are selected by traversing the randomized list.

27. The system of claim 25,
  wherein in pre-testing the curve against a second subset of the plurality of pixels, the program instructions are executable by the CPU to determine a number of the second subset of the plurality of pixels which are within a specified pixel radius of the curve;
  wherein said second test results comprise said number of the second subset of the plurality of pixels which are within the specified pixel radius of the curve;
  wherein said second criteria comprise said number of the second subset of the plurality of pixels which are within the specified pixel radius of the curve meeting or exceeding a threshold value;
  wherein in testing the curve against a first subset of the plurality of pixels, the program instructions are executable by the CPU to determine a number of the first subset of the plurality of pixels which are within the specified pixel radius of the curve;
  wherein said first test results comprise said number of the first subset of the plurality of pixels which are within the specified pixel radius of the curve; and
  wherein said first criteria comprise said number of the first subset of the plurality of pixels which are within the specified pixel radius of the curve meeting or exceeding a threshold value.

28. The system of claim 24, wherein the program instructions are further executable by the CPU to:
  perform a refined curve fit, wherein the refined curve fit is performed using a second subset of the plurality of pixels comprising pixels within said specified pixel radius of the curve, wherein in performing the refined curve fit, the program instructions are executable by the CPU to iteratively cull outlying pixels from the second subset, generate a culled subset of pixels, and fit a refined curve to the culled subset at each iteration until an ending condition is met, wherein the refined curve fit generates a refined curve, and
  generate output, comprising one or more of information regarding the refined curve, and the culled subset of the plurality of pixels, wherein the refined curve comprises a refined detected edge in the image.

29. A memory medium operable to store program instructions for performing edge detection in a received image comprising a plurality of pixels, wherein the program instructions are executable to perform:
  a) generating a curve based on two or more random pixels of the plurality of pixels;
  b) testing the curve against a first subset of the plurality of pixels, wherein said testing produces first test results;
  c) if said first test results meet first criteria, outputting information regarding the curve, wherein the curve comprises a detected edge in the image;
  d) performing a refined curve fit, wherein the refined curve fit is performed using a second subset of the plurality of pixels comprising pixels within said specified pixel radius of the curve, wherein the refined curve fit comprises iteratively culling outlying pixels from the second subset, generating a culled subset of pixels, and fitting a refined curve to the culled subset at each iteration until an ending condition is met, wherein the refined curve fit generates a refined curve, and
  e) generating output, comprising one or more of information regarding the refined curve, and the culled subset of the plurality of pixels, wherein the curve comprises a refined detected edge in the image.

30. A computer-implemented method for performing edge detection in a received image comprising a plurality of pixels, comprising:
  a) generating a curve based on two or more random pixels of the plurality of pixels;

b) testing the curve against a first subset of the plurality of pixels, wherein said testing produces first test results;

c) if said first test results meet first criteria, outputting information regarding the curve, wherein the curve comprises a detected edge in the image;

d) performing a refined curve fit, wherein the refined curve fit is performed using a second subset of the plurality of pixels comprising pixels within said specified pixel radius of the curve, wherein the refined curve fit comprises iteratively culling outlying pixels from the second subset, generating a culled subset of pixels, and fitting a refined curve to the culled subset at each iteration until an ending condition is met, wherein the refined curve fit generates a refined curve, and e) generating output, comprising one or more of information regarding the refined curve, and the culled subset of the plurality of pixels, wherein the curve comprises a refined detected edge in the image.

31. A computer based system for performing a curve fit, comprising:

a CPU;

a memory medium coupled to the CPU, wherein the memory is operable to store program instructions, and wherein the CPU is operable to execute the program instructions; and an input which is operable to receive a plurality of pixels;

wherein the program instructions are executable by the CPU to:

a) generate a curve based on two or more random pixels of the plurality of pixels;

b) test the curve against a first subset of the plurality of pixels, wherein said testing produces first test results;

c) if said first test results meet first criteria, output information regarding the curve, wherein the curve comprises a detected edge in the image;

d) perform a refined curve fit, wherein the refined curve fit is performed using a second subset of the plurality of pixels comprising pixels within said specified pixel radius of the curve, wherein in performing the refined curve fit, the program instructions are executable by the CPU to iteratively cull outlying pixels from the second subset, generate a culled subset of pixels, and fit a refined curve to the culled subset at each iteration until an ending condition is met, wherein the refined curve fit generates a refined curve, and e) generate output, comprising one or more of information regarding the refined curve, and the culled subset of the plurality of pixels, wherein the curve comprises a refined detected edge in the image.

32. A system for performing edge detection in a received image comprising a plurality of pixels, comprising:

means for storing a plurality of pixels;

means for generating a curve based on two or more random pixels of the plurality of pixels;

means for testing the curve against a first subset of the plurality of pixels, wherein said testing produces first test results;

means for, if said first test results meet first criteria, outputting information regarding the curve, wherein the curve comprises a detected edge in the image;

means for performing a refined curve fit, wherein the refined curve fit is performed using a second subset of the plurality of pixels comprising pixels within said specified pixel radius of the curve, wherein the refined curve fit comprises iteratively culling outlying pixels from the second subset, generating a culled subset of pixels, and fitting a refined curve to the culled subset at each iteration until an ending condition is met, wherein the refined curve fit generates a refined curve, and means for generating output, comprising one or more of information regarding the refined curve, and the culled subset of the plurality of pixels, wherein the curve comprises a refined detected edge in the image.

* * * * *